(12) United States Patent
Weber et al.

(10) Patent No.: US 11,468,750 B2
(45) Date of Patent: Oct. 11, 2022

(54) AUTHORING AN IMMERSIVE HAPTIC DATA FILE USING AN AUTHORING TOOL

(71) Applicant: Lofelt GmbH, Berlin (DE)

(72) Inventors: Maximilian Weber, Berlin (DE); James Mazur, Berlin (DE); Gwydion ap Dafydd, Berlin (DE); Daniel Büttner, Berlin (DE)

(73) Assignee: Lofelt GmbH, Berlin (DE)

( * ) Notice: Subject to any disclaimer, the term of this patent is extended or adjusted under 35 U.S.C. 154(b) by 52 days.

(21) Appl. No.: 17/069,622

(22) Filed: Oct. 13, 2020

(65) Prior Publication Data

US 2021/0110681 A1 Apr. 15, 2021

Related U.S. Application Data

(60) Provisional application No. 62/914,876, filed on Oct. 14, 2019.

(51) Int. Cl.
*G08B 6/00* (2006.01)
*G06F 3/16* (2006.01)
(Continued)

(52) U.S. Cl.
CPC ............... *G08B 6/00* (2013.01); *G06F 3/165* (2013.01); *G10L 21/06* (2013.01); *G10L 25/18* (2013.01); *G10L 25/51* (2013.01); *H04R 3/04* (2013.01)

(58) Field of Classification Search
CPC .......... G08B 6/00; G06F 3/165; G06F 3/016; G10L 21/06; G10L 25/18; G10L 25/51; H04R 3/04
See application file for complete search history.

(56) References Cited

U.S. PATENT DOCUMENTS

2007/0193436 A1* 8/2007 Chu ................. H04H 60/04
  84/609
2013/0322652 A1* 12/2013 Kudryavtsev .......... H03G 9/005
  381/107
(Continued)

FOREIGN PATENT DOCUMENTS

CN  105094798 A  * 11/2015 ............. G06F 3/016
EP  3104258 A1  * 12/2016 ............. G06F 3/016
(Continued)

OTHER PUBLICATIONS

International Search Report and Written Opinion prepared by the European Patent Office for PCT/EP2020/078702, dated Feb. 11, 2021, 24 pages.

*Primary Examiner* — Akelaw Teshale
(74) *Attorney, Agent, or Firm* — Chernoff, Vilhauer, McClung & Stenzel, LLP

(57) ABSTRACT

Methods and systems of authoring audio signal(s) into haptic data file(s) are disclosed. An audio analysis module analyses the audio signal(s) using filterbank(s) or by performing a spectrogram analysis. Transients are detected in the audio signal. If present, the transients are processed to determine a transient score and a transient binary. A database stores device specific information and actuator specific information. A haptic perceptual bandwidth of an electronic computing device having an embedded actuator is determined by using information from the database. A user interface allows modification of time-amplitude values and transient values based on the determined haptic perceptual bandwidth. Authored time amplitude values are aggregated in authored audio descriptor data, which is passed to a transformation module that fits the data into the haptic perceptual bandwidth and implements algorithms to produce (Continued)

transformed audio descriptor data. Finally, the transformed audio descriptor data is converted to the haptic data file.

20 Claims, 19 Drawing Sheets

(51) Int. Cl.
*G10L 25/18* (2013.01)
*G10L 25/51* (2013.01)
*H04R 3/04* (2006.01)
*G10L 21/06* (2013.01)

(56) References Cited

U.S. PATENT DOCUMENTS

| | | | |
|---|---|---|---|
| 2015/0153830 A1 | 6/2015 | Hirose et al. | |
| 2015/0154966 A1* | 6/2015 | Bharitkar | G10L 19/008 |
| | | | 381/23 |
| 2016/0187987 A1* | 6/2016 | Ullrich | G08B 6/00 |
| | | | 345/156 |
| 2017/0053654 A1* | 2/2017 | Lacroix | H04S 3/008 |
| 2018/0084362 A1* | 3/2018 | Zhang | H04S 7/00 |
| 2018/0210552 A1* | 7/2018 | Saboune | G06F 3/016 |

FOREIGN PATENT DOCUMENTS

| | | | | |
|---|---|---|---|---|
| EP | 3125076 A1 * | 2/2017 | | G06F 3/016 |
| EP | 2846218 B1 * | 4/2019 | | G06F 3/016 |

* cited by examiner

AUTHORING AN IMMERSIVE HAPTIC DATA FILE USING AN AUTHORING TOOL

FIELD OF THE INVENTION

The present invention relates to a haptic processing system for generation of haptic data using an audio signal or an audio data. More specifically, the invention relates to authoring of haptic data from the audio signal to fit into a haptic perceptual bandwidth of an electronic device having an actuator.

BACKGROUND

Haptic refers to a sense of touch or perception provided to a user as a feedback force or vibration on a user interface of an electronic device or headphones. The feedback force can provide information to the user or create a sense of perception for enhanced user experience. With technological advancement, user interfaces are now integrated with haptic interfaces that provide haptic feedback based on different parameters. These parameters vary according to user applications and embedded haptic devices. A complex process of filtering, transformation and editing is required to efficiently convert audio signal into haptic data to provide a fulfilling user experience. To provide a fulfilling user experience, the audio signal is converted into haptic data which then can be authored and enhanced. The haptic experience is delivered using haptic actuators such as Linear Resonant Actuators (LRA), Wide Band or High Definition actuators, piezo-electric actuators etc. The delivery of the haptic experience is dependent on the audio to haptic conversion of the signal, the response characteristics of the haptic actuator, device specific data, among other factors. Therefore, a proper matching of the actuator type and its response characteristics is required to augment user experience.

An impressive haptic experience can be perceived by a user if the vibration can be felt over a wide range of frequencies. Furthermore, the user should be able to differentiate the perception over different frequencies ranges for immersive haptic experience. When the vibration can't be differentiated over a wide range of frequencies, the experience is passive and only vibrations are felt giving an unrealistic experience.

In order to create an immersive haptic experience, a method and system is described. The novel method allows the user to edit the audio signal for a range of frequencies. By editing, the different frequency ranges the user can edit different frequency ranges, append new haptic points, remove haptics points to tune any type of electronic device with an actuator according to its performance characteristics. Additionally, this novel method allows users to tune different electronic devices with an actuator for performance characteristics.

SUMMARY OF THE INVENTION

An authoring system for authoring a haptic data file from an audio signal is disclosed. The authoring system includes an audio analysis module. The audio analysis module is configured to filter the audio signal. The audio analysis module may use one or more filterbanks to filter the audio signal into one or more frequency bands. In alternate embodiment, the audio analysis module may implement a spectrogram analysis for analysing the audio signal into a harmonic component and a percussive component. In yet another embodiment, the audio analysis module may implement a spectrogram analysis for analysing the audio signal into a harmonic component, a percussive component and a residual component.

The audio analysis module separates the received audio signal into one or more frequencies. Each frequency comprises time-amplitude values with a center frequency. In addition, the audio signal is also provided to a transient analysis and processing module configured to detect the transients in the audio signal and process the transients to calculate a transient binary and a transient score. A user interface allows a user to display and modify the time-amplitude values and/or the time-amplitude-frequency values and the transient values based on a haptic perceptual bandwidth. The modification of the time-amplitude values and/or the time-amplitude-frequency values the transient values can either be edited or dragged to a new value by a user. In some embodiments, at least one time-amplitude value and/or time-amplitude-frequency value is modified. In other embodiments, apart from modifying some of the time-amplitude values, new time-amplitude values may be inserted. After modification, an authored audio descriptor data is derived, which comprises a time-amplitude envelope of the time amplitude values.

In some embodiments, the time-amplitude-frequency values may be edited and/or modified to create the authored audio descriptor data.

The authoring system includes a database. The database provides an actuator specific information and a device specific information to determine the perceptual haptic bandwidth of an electronic computing device having an embedded actuator. The authored audio descriptor data is provided to a transformation module along with other descriptor data to fit the authored audio descriptor data into the haptic perceptual bandwidth to produce a transformed audio descriptor data. In some embodiments, the transformed audio descriptor data is streamed in real time to the resynthesis module for producing haptic output. Finally, the transformed audio descriptor data is passed to an aggregation and file management module for converting the transformed audio descriptor data file into the haptic data file.

In some embodiments, the modification performed on the time amplitude values and the transient values are based on combined bandwidth of an electronic computing device having an embedded actuator.

In some embodiments, the haptic perceptual bandwidth is determined by using data received from the database by calculating the mass and the acceleration of the actuator embedded into the electronic computing device.

In some embodiments, the device specific information includes device mass, a UUID for the specific device, the center of gravity of the device, geometric shape of the device, placement location of the actuator within the device, attachment characteristic of the actuator with in the device and inherent resonances of the device.

DETAILED DESCRIPTION OF INVENTION

Audio Signal

As used herein, the term "audio signal" is intended to broadly encompass all types of audio signals including analog audio signals, digital audio signals, digital audio data, audio signals embedded in video or media streams.

Haptic Output

The term "haptic output" as used herein includes a haptic signal derived from audio signals by digital signal processing.

Analyzed Audio Descriptor Data

The term "analyzed audio descriptor data", as used herein includes one or more frequency band descriptor data and a transient descriptor data. The transient descriptor data as used herein includes the transient score envelope, which is a series or array of time-transient score data points.

Authored Audio Descriptor Data

The term "authored audio descriptor data" includes one or more authored frequency band descriptor data, which has been edited and/or modified and/or additional data points have been added. Each authored frequency band descriptor data includes a center frequency, bandwidth for that frequency band, a time-amplitude envelope comprising an array of time-amplitude data points, and a frequency band rank for a specific frequency band. Additionally, the authored audio descriptor data includes authored transient descriptor data. The authored transient descriptor data includes a transient threshold value, and the transient score envelope, which is a series or array of time-transient scores data points.

Other Authored Data

The term "other authored data" includes: (a) actuator specific data such as actuator type, actuator ID, actuator bandwidth and other actuator specific information; (b) device specific data such as a device type, a device ID; and (c) perceptual data such as a perceptual threshold value, perceptual bandwidth and other information, which has been edited or changed by the user through a user interface.

Haptic Perceptual Bandwidth

The combined bandwidth of the electronic computing device along with the embedded actuator(s) over which the vibrations are produced is referred as "available bandwidth". Not all of the vibrations in the available bandwidth can be experienced by the humans through sensory stimulus. The combined bandwidth of the electronic computing device along with the embedded actuators) over which the vibrations can be felt by humans is referred as "haptic perceptual bandwidth".

Transformed Audio Descriptor Data

Figure 1:
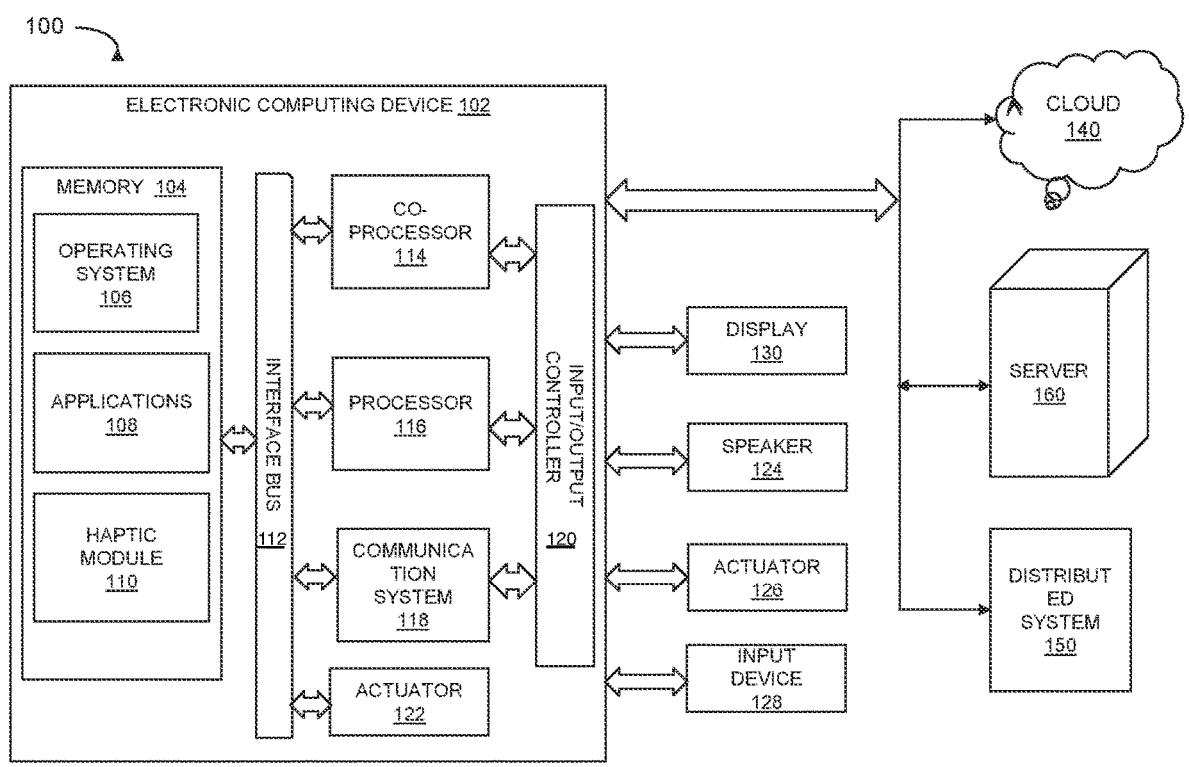
FIG. 1 illustrates an overview of an operating environment of a haptic processing system in an embodiment of the present invention.

The term "transformed audio descriptor data", as used herein includes the authored audio descriptor data comprising one or more frequency band descriptor data and a transient descriptor data that has been transformed to fit into the haptic perceptual bandwidth The present invention and its advantages are best understood by referring to the illustrated embodiments depicted in the accompanying drawings, in which like numbers designate like parts. The present invention may, however, be embodied in numerous devices for haptic signal processing and should not be construed as being limited to the exemplary embodiments set forth herein. Exemplary embodiments are described below to illustrate the present invention by referring to the figures, FIG. 1 illustrates an overview of a haptic processing system in an embodiment of the present invention. A haptic processing system 100 includes an electronic computing device 102 connected to a cloud 140, a server 160, and a distributed system 150.

The cloud 140 may be a cloud computing environment having computing resources and storage. The storage comprises one or more databases, for example, centralised database, distributed database, personal database, end-user database, commercial database, NoSQL database, operational database, relational database, cloud database, object-oriented database, graph database or some other type of database with at least one database having information about different actuators, devices in which actuators are embedded, haptic hardware, haptic game specific data, haptic preferences of users, and content information such as gaming information including game type.

The server 160 is multi-processor, multi-threaded, with a repository comprising databases, which holds at least one database having information about actuator specific information, device specific information, and content information. The distributed system 150 has distributed databases that hold information about actuator specific information, device specific information, and content information. Furthermore, the cloud. 140, the server 160, the distributed system 150 allows several developers to use authoring tools concurrently, share information, share feedback, and communicate with each other.

The electronic computing device 102 includes a memory 104, a coprocessor 114, at least one processor 116, a communication system 118, an input/output controller 120, and one or more haptic actuators 126 apart from other software and/or hardware. For example, the electronic computing device 102 includes in the memory 104, one or more applications 108 for authoring different types of software games. An interface bus 112 provides power supply and also enables data communication between the memory 104, the processor 116, the coprocessor 114, the input/output controller or the I/O controller 120, the communication system 118 and one or more actuators 122. The I/O controller 120 interfaces with devices such as a display 130, at least one speaker 124, one or more haptic actuators 126, and at least one input device 128 such as a keyboard, a mouse, a gamepad, a joystick, a touch panel, or a microphone. The I/O controller 120 provides power supply, control information, and enables data communication between the display 130, the speaker 124, the one or more haptic actuators 126 and the input device 128. Alternatively, the display 130, the speaker 124, the one or more haptic actuators 126, and the input device 128 can receive power supply from an external source.

The memory 104 comprises an operating system 106, one or more applications 108, and a haptic module 110. In some embodiments, at least one application 108 for authoring the software games may reside in the haptic module 110. For example, the applications 108 include a game authoring application and/or a game editing application with a user interface that allows a user to edit time-amplitude values, time frequency values of the audio signal to derive and/or modulate haptic output. The haptic module 110, which may be a combination of hardware and software in some embodiments, include executable instructions to produce a haptic signal from an audio signal for providing a haptic experience.

In an alternate implementation, the haptic module 110 is implemented as software on the electronic computing device 102 having one or more embedded actuators 122. The haptic module 110 communicates with the cloud 140, the server 160, the distributed system 150 through the communication system 118. In another implementation, the haptic module 110 is a separate module with a dedicated processor and a memory. The haptic module 110 controls the haptic output of at least one actuator 126.

The memory 104 can be a Read-Only Memory (ROM), Random-Access Memory (RAM), digital storage, magnetic tape storage, flash storage, solid-state device storage or some other type of storage device. The memory 104 can store encrypted instructions, source code, binary code, object code, encrypted compiled code, encoded executable code, executable instructions, assembly language code or some other type of computer readable instructions.

The processor 116 and the coprocessor 114 are hyper-threading, multi-tasking, and multi-processing. Alternatively, the processor 116 can be a special purpose processor or some other type of microprocessor capable of processing analog or digitalized audio signals. The processor 116 and the coprocessor 114 can implement special hardware that is designed for digital signal processing, for example, MMX technology provided by Intel®. MMX technology provides an additional instruction set to manipulate audio, video, and multimedia. The processor 116 can any type of processor such as MMX, SSE, SSE2 (Streaming SIMD Extensions 2), SSE3 (Streaming SIMD Extensions 3), SSSE3 (Supplemental Streaming SIMD Extensions 3), SSE4 (Streaming SIMD Extensions 4) including the variants SSE 4.1 and SSE4.2, AVX (Advanced Vector Extensions), AVX2 (Haswell New Instructions), FMA (Fused multiply—add) including FMA3, SGX (Software Guard Extensions), MPX (Memory Protection Extensions), Enhanced Intel SpeedStep Technology (EIST), Intel® 64, XD bit (an NX bit implementation), Intel® VT-x, Intel® VT-d, Turbo Boost, Hyper-threading, AES-NI, Intel® TSX-NI, Intel® vPro, Intel® TXT, Smart Cache or some other type of implementation for a processor. The processor 116 or the coprocessor 118 can be a soft processor such as the Xilinx MicroBlaze®, processor that can include at least one microcontroller, real-time processor, an application processor and the like.

The communication system 118 can interface with external devices/applications via wired or wireless communication. For example, the communication system 118 can connect to a server 160 via wired cable. The communication system 118 has an encoder, a decoder, and provides a standard interface for connecting to wired and/or wireless networks. Examples of interface include, but are not limited to, ethernet RJ-45 interface, thin coaxial cable BNC interface and thick coaxial AUI interface, FDDI interface, ATM interface and other network interface.

In some embodiments, the haptic module 110 for authoring software games may be implemented in the cloud 140, the distributed system 150 or the server 160. When the haptic module 110, which includes the authoring software is implemented in the cloud 140, the distributed system 150 or the server 160 a haptic output may be provided to the electronic computing device 102 having the embedded actuator 122 in form of a haptic file or a real time data stream or a stored data stream. The haptic file may be parsed by the haptic module 110 for providing immersive haptic experience.

Figure 2:
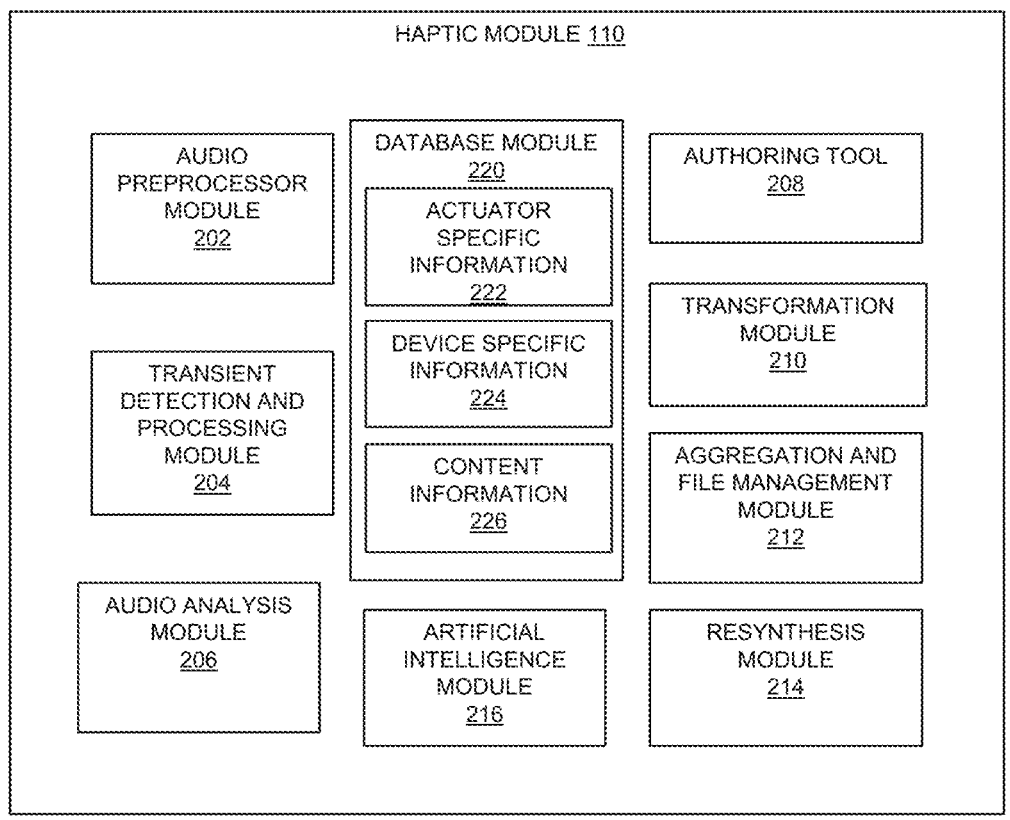
FIG. 2 illustrates different parts of the haptic module in an embodiment of the present invention.

FIG. 2 illustrates different components of the haptic module 110 in an embodiment of the present invention. The haptic module 110 residing in the memory 104 of the electronic computing device 102. The haptic module 110 includes an audio preprocessor module 202, a transient detection and processing module 204, an audio analysis module 206, a database module 220, an artificial intelligence module 216, an authoring tool 208, a transformation module 210, an aggregation and file management module 212, and a resynthesis module 214.

In one variation of this implementation, the audio preprocessor module 202 is embedded within the audio analysis module 206. In another variation of this implementation, the resynthesis module 214 may include the aggregation and file management module 212.

The database module 220 comprises an actuator specific information 222, a device specific information 224 and a content information 226. The actuator specific information 222 stores technical information related to different actuators. For example, the actuator specific information includes make, type of actuator (LRA, Piezo-electric actuator, wideband actuator, etc.), resonant frequency of the actuator, mass of the actuator, acceleration of the actuator and other technical information related to actuators.

The device specific information 224 information may include information such as but not limited to the type of electronic computing device (mobile phone, gamepad, tablet etc.), type of actuator embedded in the device electronic computing device, mass of the electronic computing device, the weight of the electronic computing device with embedded actuator and other parameters related to electronic computing device. In different embodiments, the electronic computing device 102 can be a desktop computer, a laptop, a gaining console, a mobile computing device such as a phone or a tablet, a gaming controller such as a joystick, gamepad, flight yoke, gaming mouse, gaming keyboard, keyboard wrist rest, mouse pad, headphones or some other type of electronic computing device.

The content information 226 includes information that will be analyzed for producing haptic effect. The content information 226 may include type of content, for example, game, multimedia file, song or some other type of content. In some embodiments, the type of content may be categorised according to the haptic experience, for example, content with high haptic experience, content with normal haptic experience, and content with low haptic experience. In addition, in some embodiments, the content may include user specific information, user characteristic, user experience with haptics and the like.

Figure 3:
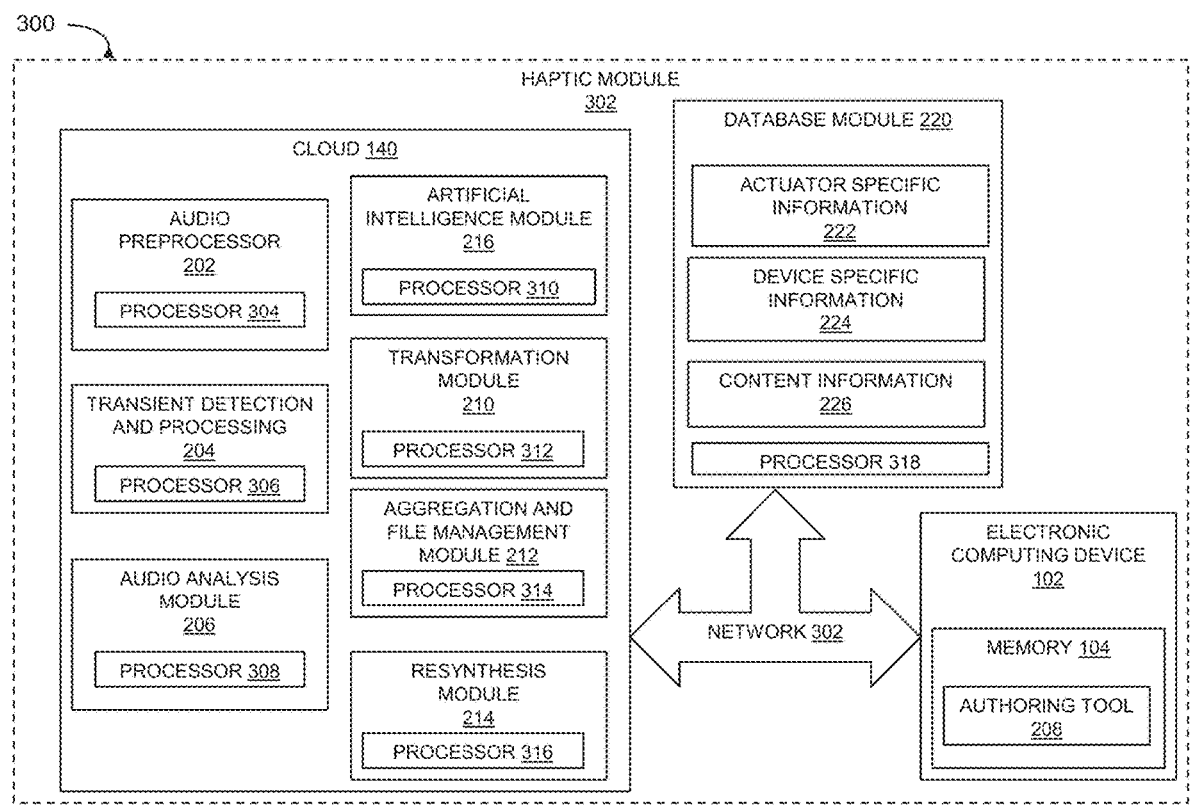
FIG. 3 illustrates the haptic module operating in a distributed environment in an embodiment of the present invention.

FIG. 3 illustrates a distributed haptic module implementation in an embodiment of the invention. In this implementation, some modules of the haptic module 110 may reside in the cloud 140, some modules of the haptic module 110 may reside on the server 160, and some modules of the haptic module 110 may reside in the distributed system 150 within a network 302. FIG. 3 shows one of the different implementations of the haptic module 110 distributed among different devices, however, in other implementations the haptic module 110 may include additional modules or fewer modules, which are distributed over the distributed system 150 in the network 302.

In an exemplary implementation, the audio preprocessor module 202, the transient detection and processing module 204, the audio analysis module 206, the artificial intelligence module 216, the transformation module 210, the aggregation and file management module 212, and the resynthesis module 214 all reside on the cloud 140. The database module 220 resides as a distributed database in the network 302. The database module 220 may include a processor 318 and a memory. The database module 220 may also be implemented over a distributed system 150 as a distributed database.

Each module of the haptic module 302 can have a dedicated processor and memory. For example, the audio preprocessor module 202 has a processor 304 and an associated memory, the transient detection and processing module 204 has a processor 306 and an associated memory, the audio analysis module 206 has a processor 308 and an associated memory, the artificial intelligence module 216 has a processor 310 and an associated memory, the transformation module 210 has a processor 312 and an associated memory, the aggregation and file management module 212 has a processor 314 and an associated memory, the resynthesis module 214 has a processor 316 and an associated memory.

The authoring tool 208, which resides in the electronic computing device 102 has a processor 116 and the memory 104.

In another exemplary variation of this implementation, the audio preprocessor module 202, the transient detection and processing module 204, the audio analysis module 206, the artificial intelligence module 216, the transformation module 210, the aggregation and file management module 212, the resynthesis module 214, and the authoring tool 208 can reside on the server 160. The database module 220 can be a distributed database, a standalone database, a cloud database or a network implemented database residing within the network 302 and may be associated with the server 160. Other variations and implementations are possible for deploying all the different modules such as the audio preprocessor module 202, the transient detection and processing module 204, the audio analysis module 206, the artificial intelligence module 216, the transformation module 210, the aggregation and file management module 212, the resynthesis module 214, the authoring tool 208, and the database module 220 over the cloud 140, the server 150, and the distributed system in the network 302.

FIG. 2 and FIG. 3 are exemplary illustrations and should not be construed as limiting for the implementation of the haptic module 110 in the network 302.

Figure 4:
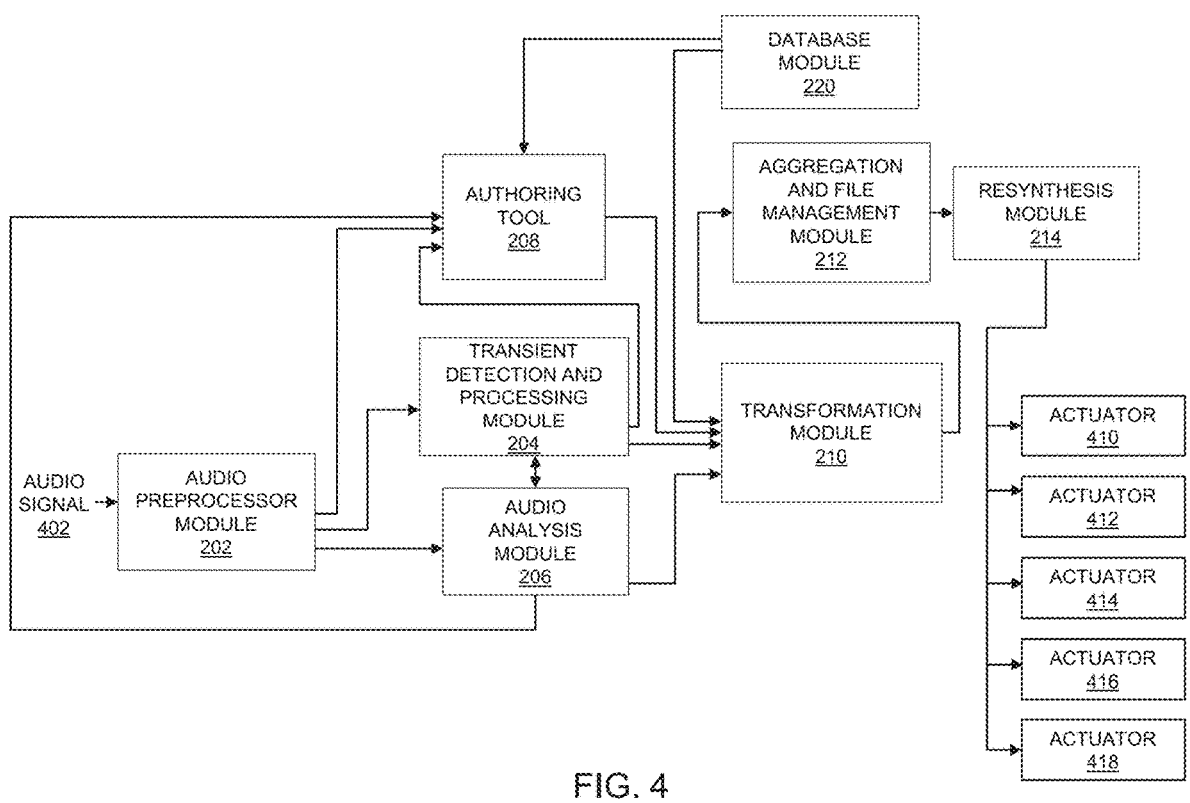
FIG. 4 illustrates the different parts of haptic processing system in an embodiment of the present invention.

FIG. 4 illustrates the process of analysis of an audio signal in different modules in an embodiment of the present invention. The audio preprocessor module 202 receives an audio signal 402. The audio preprocessor module 202 downsamples and conditions the audio signal 402 to remove unwanted high frequency signal components and noise. The preprocessed audio signal is simultaneously passed to the transient detection and processing module 204, the audio analysis module 206, and the authoring tool 208. In some embodiments, the preprocessed audio module 202 may be combined in the audio analysis module 206.

The transient detection and processing module 204 detects the presence of transients in the preprocessed audio signal. If transients are detected, the transient detection and processing module 204 performs the analysis of the transients in the preprocessed audio signal. The analyzed transients are converted into transient descriptor data, which is passed simultaneously to the transformation module 210 and the authoring tool 208. The transient descriptor data includes a transient score. The transient score is calculated from the preprocessed audio signal and the time-transient scores are stored in the transient array.

In some embodiments, the transient detection and processing module 204 may directly receive the audio signal 402.

The audio analysis module 206 breaks up the received preprocessed audio signal into different frequency bands using one or more filter banks. Alternatively, in another embodiment, the audio analysis module 206 may implement spectrogram analysis for determining a harmonic component and a percussive component. In yet another embodiment, the spectrogram analysis of the received signal determines the harmonic component, fixe percussive component and a residual component.

When the audio analysis module 206 implements one or more filterbanks, the preprocessed audio signal received from the preprocessor module 202 is passed to one or more filter banks. The number of filter banks is decided based on the number of factors, such as, but not limited to audio signal characteristics, haptic experience, resonant frequency of the electronic computing device having an embedded actuator etc. Each filterbank can either be a digital filter or an analog filter or a combination of a digital filter and an analog filter, which is tuned to a specific frequency bandwidth. In one implementation, one or more filter banks can be utilised for separating the preprocessed audio signal into different frequency bands. For example, the frequency bands can be of fixed linear-scale bandwidth, that is, 30 Hz to 70 Hz, 70 Hz-110 Hz, 110 Hz-150 Hz, etc. Alternatively, the frequency bands can be of fixed logarithmic-scale bandwidth such as 30 Hz-51 Hz, 51 Hz-87 Hz, 87 Hz-150 Hz, etc. Other mathematical functions can be used to generate fixed bandwidth scales. Alternatively, the frequency bands can be unequal bandwidths such as 30 Hz-60 Hz, 60 Hz-115 Hz, 115 Hz-200 Hz, etc, and may be chosen to correspond with different haptic perception ranges. Each frequency band is analyzed to derive a time-amplitude envelope. The time-amplitude envelope of each frequency band has a center frequency, which is preferably the average of the upper frequency and the lower frequency of each of the frequency bands. In a variation of this implementation, the center frequency is calculated on a logarithmic scale. The time-amplitude envelope is filtered to reduce abrupt signal changes to create a smooth time-amplitude envelope. Additionally, the smooth time-amplitude envelope is reproduced using a minimum number of time amplitude values without losing signal information in a data reduction process. In one variation of this implementation, some time-amplitude values are discarded to reduce the number of time-amplitude data points, which results in a smooth time amplitude envelope. However, while reducing or discarding the time-amplitude points, the information loss of the original signal is minimized.

In another implementation, the audio analysis module may use a spectrogram analysis to calculate the harmonic component and the percussive component. The audio analysis module 206 receives the preprocessed audio signal, which is analyzed using a spectrogram. The spectrogram produces the time-frequency representation of signals by converting the audio signal into the frequency domain using Fourier transformation. The frequency domain signal is analyzed and processed in the frequency domain. Thereafter, an Inverse Fourier transformation is performed on the time-frequency signal to convert it back into the time domain. In some embodiments, the spectrogram analysis of the preprocessed audio signal can also be performed in the time domain by first converting the audio signal into the frequency domain and then converting back the plot of the intensity of the frequency content of the signal into the time domain for further analysis.

In yet another implementation, the audio analysis module may use a spectrogram analysis to calculate the harmonic component, the percussive component and the residual component. The audio analysis module 206 receives the preprocessed audio signal, which is analyzed using a spectrogram to derive the harmonic component and the percussive component. The sum of the harmonic component and the percussive component is subtracted from the spectrogram to produce the residual component. The spectrogram produces the time-frequency portraits of signals by converting the audio signal into the frequency domain using Fourier transformation. The frequency domain signal is analyzed and processed in the frequency domain. Thereafter, an Inverse Fourier transformation is performed on the time-frequency signal to convert it back into the time domain.

The audio analysis module 206 passes the analyzed audio signal to the authoring tool 208. The authoring tool 208 also receives the preprocessed audio signal from the audio preprocessor module 202, the transient descriptor data from the transient detection and processing module 204. Additionally the database module 220 passes the actuator specific information 222, the device specific information 224 and the content information 226 to the authoring tool 208. A query processor executes queries received from the authoring tool 208. The actuator specific information 222 includes parameters related to the haptic actuator, such as, but not limited to, type of actuator (e.g. eccentric rotating mass, piezo, voice coil motor, linear resonant actuator), a universally unique identifier (UUID), model number, serial number, manufacturer details, mass, resonant frequency/frequencies of the actuator, acceleration over frequency responses curves by different attached masses, rise and fall times of the actuator with different masses, direction of vibration and other operating parameters such as impedance, sound pressure level, rub and buzz, and input power.

The device specific information 224 stored in the database module 220 includes parameters related to device(s) in which the actuator(s) can be embedded such as, but not limited to, mass of the device, a UUID of the device, the center of gravity of the device, geometric shape of the device, placement location of the actuator within the geometric shape of the device, attachment characteristic of the actuator in the device such as attachment stiffness and viscosity, and inherent resonances of the device.

In some embodiments, the device specific information 224 and actuator specific information 222 can be related to each other. The device specific information 224 can include the actuator specific information 222. For example, the resonant frequency of the computing device 102 can be measured with the actuator 122. Likewise, the resonant frequency can be measured by inserting a different actuator, that is, the actuator 126 in the computing device 102. The combined resonant frequency of the electronic computing device 102 with different actuators can be stored in the database module 220. For example, the combined resonant frequency of the electronic computing device 102 measured with different types of actuators such as but not limited to LRA, piezoelectric actuators, or wideband actuators may be determined and stored in the database module 220. The database module 220 also holds data related to resonant frequency and other haptic parameters for the computing device 102 with one or more different actuators, such as the actuator 120 and/or the actuator.

The contextual information related to games includes, but is not limited to, type of games (simulations, real time strategy, adventure, massively multiplayer online etc), gaming activities, gaming content, gaming log and previous gaining activities, a specific profile, a microphone and/or camera, face recognition technology, eye tracking data and user stress levels. In addition, the contextual information can also be related to user psychology such as user preferences with respect to haptic experience, for example, strong vibration versus weak vibration, frequency vibrational experience versus moderate vibrational experience, and other variables such as current user state, current game, current game level and the related psychological parameters. The contextual information can be employed to determine a user's current focus of attention to determine what types of haptic feedback will be most appropriate for the user.

In some embodiments, the contextual information related to the electronic computing device 102 can be utilised to create customized haptics in real time information based on the characteristics of the electronic computing device 102. For example, if the electronic computing device 102 is a mobile phone then customisation of vibrational feedback is provided based on its location, position, placement, and direction. In another example, the mobile phone may vibrate differently, when held in the hand as compared to when placed on a table.

The authoring tool 208 has a user interface for changing the different parameters of the processed audio signal received from the audio analysis module 206, the database module 220, and the transient detection and processing module 204. For example, the user interface allows changing and/or editing the time-amplitude values of the received audio signal for one or more frequency bands. In some embodiments, the editing/changing the time amplitude values of the received audio signal for one or more frequency bands may alter the time-amplitude envelope of one or more frequency bands. Likewise, the user interface allows changing and/or editing of the transient description data to provide an immersive haptic experience. In different embodiments, the received audio signal parameters can be time-amplitude values, time-frequency-amplitude values, center frequency values (center frequency for each frequency band) or other values representing audio signal characteristics. In addition, in other variations of this implementation, the center frequency of each frequency band can be changed or edited to a new value by the user for one or more frequency bands. In addition, optionally, the edited center frequency for one or more bands can also be ranked.

The user interface may allow editing/changing or adding time-amplitude values to the transient descriptor data, which is received from the transient detection and processing module 204.

In different embodiments, the process of editing/changing or appending the time-amplitude values or time-frequency-amplitude values may involve:
  (a) editing the analyzed audio descriptor data
  (b) adding additional time-amplitude values in the analyzed audio descriptor data,
  (c) deleting one or more time-amplitude values in the analyzed audio descriptor data
  (d) tweaking one or more time-amplitude values to redraw the time-amplitude curve to create a desired haptic curve
  (e) shifting the center frequency of the one or more frequency bands,
  (f) changing one or more frequency bands rankings, and
  (g) editing or changing transients and/or noise shaping time-amplitude values to achieve a desired haptic curve.

In some embodiments, the time-amplitude values of the processed audio signal received from the audio analysis module 206 can be modified to create additional frequency bands. In some embodiments, the frequency bands may be merged. In some embodiments, the frequency bands may be deleted or changed to match the haptic perceptual bandwidth. The creation of additional frequency bands or merging of the frequency bands can either be performed by the haptic processing system 100 or can be manually performed by the user.

The authoring tool 208 passes a query to the database module 220 to extract the actuator specific information 222, the device specific information 224, and the content information 226. The information received from the database module 220 is utilized to adjust the analyzed audio descriptor data and the transient descriptor data for producing optimal haptic experience for different types of actuators 410-418. By way of example and not a limitation, the actuator 410 can be a VCM (Voice Coil Motor) wideband actuator, the actuator 412 can be a piezo-electric actuator and the actuator 414 can be an LRA (Linear Resonant Actuator).

The preprocessed audio signal received from the audio preprocessor module 202, the transient descriptor data received from the transient detection and processing module 204, the analyzed audio descriptor data received from the audio analysis module 206 is displayed in the user interface of the authoring tool 208. In addition, the user interface also displays the modified time-amplitude values and the center frequency for one or more frequency bands. In addition, the time-transient values, the noise entropy and/or the noise shaping curves are also displayed in the user interface. In addition, the user can modify the information received from various modules, for example, the user can select a specific frequency band as a primary frequency band from the one or more frequency bands during editing and processing of the analyzed audio descriptor data received from the audio analysis module 206. Furthermore, the user can rank the different frequency bands as per user preferences. For example, the user can rank the frequency bands by changing the ordering provided by the audio analysis module 206. Additionally, the user can edit the time-amplitude values of the time-amplitude envelope of each frequency band or edit the time-transient score values of the transient descriptor data before passing an authored audio descriptor data to the transformation module 210.

In some embodiments, the authoring tool 208 can utilize the artificial intelligence module 216 to automate the process of analysing and changing the signal and/or data from the audio preprocessor module 202, the transient descriptor data received from the transient detection and processing module 204, and the analyzed audio descriptor data from the audio analysis module 206, and the actuator specific information 222 and device specific information 224 from the database module 220 to manipulate the analyzed audio descriptor data into authored audio descriptor data.

In an exemplary implementation, the artificial intelligence modules learn from the modification made by the user through the authoring tool 208 and subsequently suggest modification for the next window of the analyzed audio signal. The analyzed audio signal may be passed using a fixed window size or in alternate embodiment using a variable window size. In some embodiments, the window size can be user defined. Each window size can include a fixed number of audio packets or in other embodiments a variable number of audio packets.

In some embodiments, the audio packets contain audio data corresponding to one or more frequency bands.

In other embodiments using spectrogram, the audio packets contain audio data corresponding to the harmonic component and the percussive components.

In some other embodiments using spectrogram, the audio packets contain audio data corresponding to the harmonic component, the percussive components and the residual component.

The transformation module 210 receives and analyzes the authored audio descriptor data from the authoring tool 208, the transient descriptor data from the transient detection and processing module 204, the analyzed audio descriptor data from the audio analysis module 206, and other authored data comprising the actuator specific information 222 and device specific information 224 from the database module 220 to transform the authored audio descriptor data to fit into the haptic perceptual bandwidth of the electronic computing device 102 having embedded actuator 122.

The process of transformation involves executing algorithms for fitting the authored audio descriptor data to derive the transformed audio descriptor data. The transformed audio descriptor data is the optimised transformed data that fits into haptic perceptual bandwidth of the electronic computing device 102 having embedded actuator 122 for producing immersive haptic experience. The transformed audio descriptor data is passed to the aggregation and file management module 212. In a variation of this implementation, the transformation module 210 can be implemented in a distributed environment as a standalone device, wherein the transformation module 210 includes a transformation processor and/or a memory and other modules such as the communication system 118, the I/O controller 120 and the display 130.

The aggregation and file management module 212 performs the data reduction, aggregation, and file management on the transformed audio descriptor data received from the transformation module 210 to generate a haptic data file in the form of a computer readable file. In one variation of this implementation, the aggregation and file management module 212 is embedded within the transformation module 210 and performs the function of the transformation module 210 and the aggregation and file management module 212. For example, when the transformation module 210 includes the aggregation and file management module 212, the transformation module 210 performs the function of executing algorithms for combining data to create the transformed audio descriptor data and further performs the function of the data reduction, aggregation, and file management. The haptic data file is a computer readable file, which may be a JSON, an XML, a CSV, a text file or some other type of computer readable file format.

The haptic data file is passed to the resynthesis module 214, which parses the computer readable file to extract the transformed audio descriptor data. The resynthesis module 214 includes one or more synthesizers for generating the haptic output from the computer readable file on the electronic computing device 102 having embedded actuator 122 or on one or more actuators such as the actuator 410, the actuator 412, the actuator 414, the actuator 416, and the actuator 418.

The resynthesis module 214, in some embodiments, include one or more band synthesizers for generating a haptic output on one or more actuators, such as, the actuator 410, the actuator 412, the actuator 414, the actuator 416, and the actuator 418. In this implementation, the different actuators may be embedded in different devices such as a headphone, a vest or a game controller.

Figure 4A:
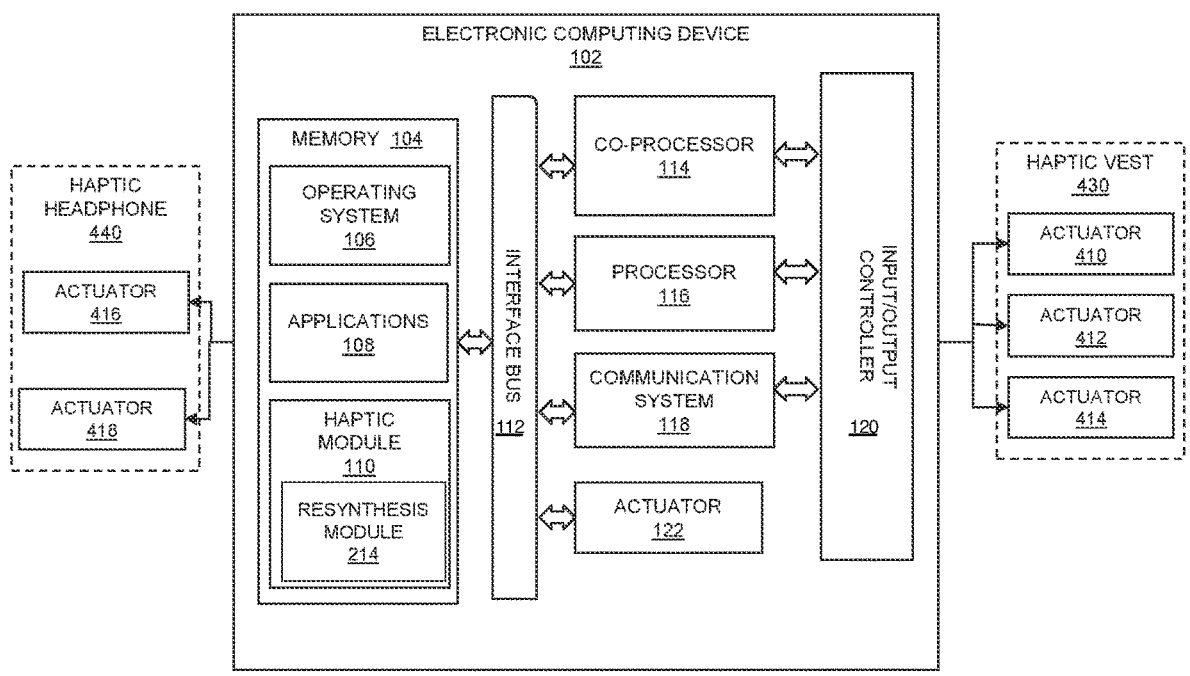
FIG. 4A illustrates the haptic processing system with multiple actuators configuration in an embodiment of the present invention.

FIG. 4A illustrates the synthesis process in an embodiment of the present invention. In this embodiment, the haptic data file is authored and transformed separately and the electronic computing device 102 has the resynthesis module 214 stored in the memory 104. The haptic data file, which has been authored and transformed according to the combined frequency bandwidth of the electronic computing device 102 and the actuator 122. In addition, the actuators 416-418 have been embedded in a haptic headphone 440, and a haptic vest 430 includes the actuator 410, the actuator 412, and the actuator 414. The haptic data file is synthesized by the synthesis module 214 and the haptic experience is produced by the electronic computing device 102 through actuator 122. In addition, the haptic headphone 440 and the haptic vest 430 also produce haptic experience through embedded actuators.

The haptic data file is authored and transformed for different devices associated with the haptic processing system 100. For example, the haptic processing system 100 may be connected to the electronic computing device 102 having embedded actuator 122, the haptic vest 430 and the haptic headphone 440. In this implementation, the haptic modules may provide different channels for producing haptic output from each of the connected devices as shown in FIG. 4A. In other embodiments, there may be additional devices attached to the haptic processing system 100. Furthermore, in this implementation, the resonant frequency of the connected devices is determined, mapped to the closest frequency band based on the resonant frequency of each device, and subsequently authored and transformed according to the frequency band to which the resonant frequency is associated.

In embodiments, the electronic computing device 102 may be a gamepad integrated with the haptic vest 430 and the haptic headphones 440. In one variation of this implementation, the haptic perceptual bandwidth of the haptic headphone 440 and the haptic perceptual bandwidth of haptic vest 430 may be separately calculated and provided to the authoring tool 208.

In some embodiments, the authoring tool 208 is implemented as a software. However, in other variations of this implementation, the authoring tool 208 can also be implemented as a combination of software and hardware. Furthermore, the authoring tool 208 can be implemented on the distributed system 150, or as a standalone software in the server 160 or the electronic computing device 102.

Figure 5:
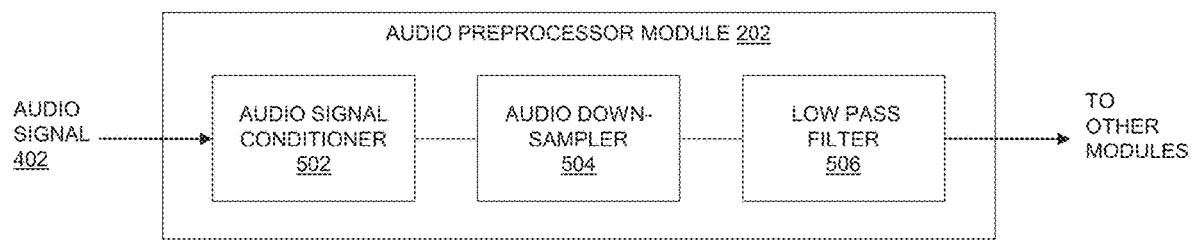
FIG. 5 illustrates different parts of a preprocessing module in an embodiment of the present invention.

FIG. 5 illustrates the different parts of an audio preprocessor module in an embodiment of the present invention. The audio preprocessor module 202 comprises a signal conditioner 502, an audio down-sampler 504, and a low pass filter 506. The signal conditioner 502 reduces unwanted noise, distortion, and non-linearity, which creeps into the audio signal 402 due to electronic components, electromagnetic interference, and other reasons. If no signal conditioning is required, the signal conditioner 502 can be bypassed or removed from the audio preprocessor module 202. The audio down-sampler 504 receives and down-samples the audio signal 402 to a lower acceptable sampling rate, preferably below 22 kHz to reduce unwanted information in the audio signal 402 for haptic processing by other modules. For example, if the audio signal 402 is sampled at 44.1 kHz, the audio down-sampler 504 will down-sample the received audio signal 402 to a sampling rate of 22.05 kHz or less. If the audio signal 402 does not require down-sampling, the process of down-sampling is bypassed.

The audio preprocessor module 202 also includes the low pass filter 506 to filter out the high frequency components in the audio signal 402. The preprocessed audio signal is passed to the transient detection and processing module 204, and the audio analysis module 206, and the authoring tool 208.

In one variation of this implementation, the audio preprocessor module 202 is embedded within the audio analysis module 206.

Figure 6:
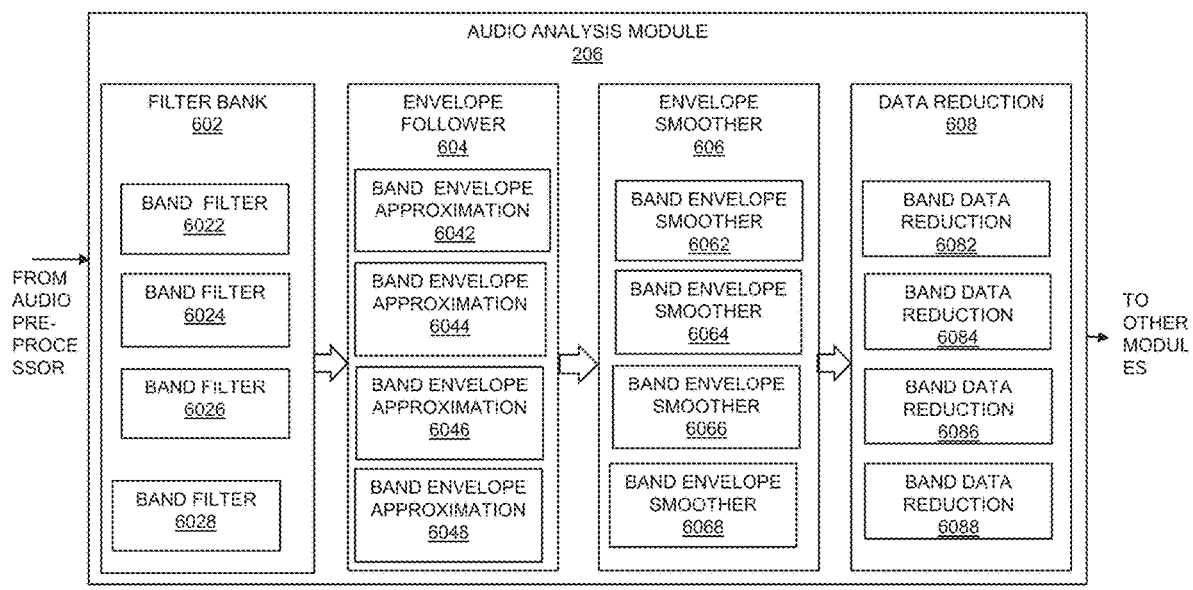
FIG. 6 illustrates different parts of the audio analysis module in an embodiment of the present invention.

FIG. 6 illustrates the different parts of an audio analysis module in an embodiment of the present invention. The audio analysis module 206 receives the preprocessed audio signal from the audio preprocessor module 202. Alternatively, the audio analysis module 206 can directly receive the audio signal 402, when the preprocessor module 202 is embedded within the audio analysis module 206.

The audio analysis module 206 can perform the analysis of the preprocessed audio signal by implementing (a) filter bank analysis method, (b) a harmonic-percussive method, and (c) a harmonic-percussive-residual method.

Referring to FIG. 6, the audio analysis module 206 comprises a filter bank 602, an envelope follower 604, an envelope smoother 606, and a data reduction 608. The preprocessed audio signal received from the audio preprocessor module 202 is separated into different frequency bands by the filter bank 602. The preprocessed audio signal is processed using a window, each window having a predefined number of audio packets. The audio analysis module 206 analyzes the audio packets in each window before processing and analysing the audio packets in the next window.

In one variation of this implementation, the window size can have a variable number of audio packets. Alternatively, in another variation of this implementation, the window size may comprise a variable number of audio packets. Each frequency band has a center frequency, an upper cut-off frequency and a lower cut-off frequency. The difference of the upper cut-off frequency and the lower cut-off frequency of the frequency band is the bandwidth of that frequency band. The center frequency is preferably the average value of the upper cut-off frequency and the lower cut-off frequency of the frequency band. In some embodiments, the center frequency can be a median value, a modal value, or a logarithmic means. A selection button in the graphical user interface may be used for changing the value of the center frequencies of the one or more frequency bands.

The filter bank 602 includes one or more band pass filters, such as a band filter 6022, a band filter 6024, a band filter 6026, and a band filter 6028. Although only four band filters are shown in the filter bank 602, in other variations the filter bank 602 can have a higher or lower number of band filters.

The center frequency of each band pass filter can be evenly spaced over a frequency range in a linear or a logarithmic scale. Alternatively, the user can set the center frequency of each band pass filter such as the band filter 6022, the band filter 6024, the band filter 6026, and the band filter 6028. The lower frequency and the upper frequency of band filters 6022-6028 can be predefined or can be defined by the user. For example, the first band pass 6022 filter has a lower frequency of 0 Hz and an upper frequency of 60 Hz and a bandwidth of 60 Hz. Likewise, the band filter 6024, the band filter 6026, and the band filter 6028 have a bandwidth of 60 Hz with the lower frequency and the upper frequency of 60-120 Hz, 120-180 Hz and 180-240 Hz, respectively.

In another variation of this implementation, each band filter 6022-6028 has a variable bandwidth. For example, the band filter 6022 has a lower frequency of 0 Hz and an upper frequency of 40 Hz with bandwidth of 40 Hz. Similarly, the band filter 6024, the band filter 6026, and the band filter 6028 have variable frequency bands such as 20-60 Hz, 60-120 Hz, 120-200 Hz, respectively.

The output of the filter bank 602 is the audio signal comprising audio signals filtered into different frequency bands by the filter bands 6022-6028. The band separated audio signals are passed to the envelope follower 604. The envelope follower 604 includes a band envelope approximation 6042, a band envelope approximation 6044, a band envelope approximation 6046, and a band envelope approximation 6048. In the current implementation, the band envelope approximation 6042 receives the audio signal filtered by the band filter 6022 at a specific frequency range. Likewise, the band envelope approximation 6044, the band envelope approximation 6046, and the band envelope approximation 6048 receive the signals filtered into specific frequency bands by the band filter 6024, the band filter 6026, and the band filter 6028.

The envelope follower 604 implements approximation of time-amplitude values of the time-amplitude envelope of each frequency band by using the band envelope approximation 6042-6048.

In one variation of this implementation, the band envelope approximation 6042-6048 includes at least one envelope follower, a memory bank, and an optional processor.

In another variation of this implementation, the envelope follower 604 is utilized for generating time amplitude values for each frequency band using Hilbert transformation in the band envelope approximation 6042-6048.

The band filtered audio signal is approximated in the band envelope approximation 6042-6048 to form a time-amplitude envelope for each of the frequency bands. The time-amplitude envelopes are an array of time-amplitude data values, which represent the amplitude values over the time for each frequency band. For example, the band envelope approximation 6042 approximates the time-amplitude envelope output of the band filter 6022. Likewise, the band envelope approximation 6044 approximates the time-amplitude envelope for the band fitter 6024, the band envelope approximation 6046 approximates the time-amplitude envelope for the band filter 6026, and the band envelope approximation 6048 approximates the time-amplitude envelope for the band filter 6028. To summarize, the band envelope approximation 6042-6048 represents the approximate time-amplitude values that represent the changes in the received audio signal by a smooth envelope of the time-amplitude data values.

The output of the envelope follower 604 is passed to the envelope smoother 606. The envelope smoother 606 includes a band envelope smoother 6062, a band envelope smoother 6064, a band envelope smoother 6066, and band envelope smoother 6068. Each band envelope approximation 6042-6048 passes the approximated time-amplitude envelope to the corresponding band envelope smoother 6062-6068. In the current implementation, the band envelope smoother 6062 receives the time-amplitude envelope from the band envelope approximation 6042. Likewise, the band envelope smoother 6064, the band envelope smoother 6066, and the band envelope smoother 6068 receive the time-amplitude envelope from the band envelope approximation 6044, the band envelope approximation 6046, and the band envelope approximation 6048, respectively. The band smoother 606 smoothes the time amplitudes values by removing outliers. For example, removing extraneous time-amplitude data points, removing time-amplitude data points, which are outliers, or other points that don't contribute directly or indirectly for generation of haptic output and to generate the smooth time-amplitude envelope.

For example, the envelope smoother 606 smoothes the time-amplitude envelope to reduce abrupt signal changes and generates a smoothed time-amplitude envelope at the center frequency for each of the frequency bands. Due to large variation in the amplitude values, there are abrupt signal changes; these abrupt signal changes are smoothed using the envelope smoother 606. The smoothing process eliminates outliers, clips of sharp peaks, and produces a smoothed time-amplitude envelope for each frequency band. The envelope smoother 606 has multiple band smoothers, one for each of the frequency bands, such as the band envelope smoother 6062-6068, having at least one digital filter, a memory bank, and an optional processor. The envelope smoother can be a filter such as a low-pass Butterworth filter with a cut-off frequency of 250 Hz. However, in other implementations, different types of filters can also be implemented and the filters can be set to different cut-off values ranging between 30 Hz to 1000 Hz. In a different implementation, the audio analysis module 206 has an audio analysis processor and memory to store and execute envelope smoothing algorithms, for example, numerical analysis, B-splines, AI algorithms and other known techniques of curve smoothening.

The output of the envelope smoother 606 is passed to the data reduction 608. The data reduction 608 includes a band data reduction 6082, a band data reduction 6084, a band data reduction 6086, and a band data reduction 6088. The band data reduction 6082 receives the smoothened time-amplitude envelope from the band envelope smoother 6062. Likewise, the band data reduction 6084, the band data reduction 6086, and the band data reduction 6088 receive the smoothened time-amplitude envelope from the band envelope smoother 6064, the band envelope smoother 6066, and the band envelope smoother 6068.

The data reduction 608 reduces the number of time-amplitude data points of the smoothed time-amplitude envelope and produces a reduced time-amplitude envelope. The reduced time-amplitude envelope is substantially similar to the smoothed time-amplitude envelope, but has a reduced number of time-amplitude data points. The reduced time-amplitude band envelope is created for each frequency band, which includes the center frequency value, a series or an array of reduced time-amplitude data points. The data reduction 608 includes the band data reduction 6082, the band data reduction 6084, the band data reduction 6086, and the band data reduction 6088; each band data reduction 6082-6088 implements data reduction algorithms.

In one variation of this implementation, the audio analysis module 206 has a memory and a processor. The data reduction 608 reduces the smoothed time-amplitude envelope into a minimum number of time-amplitude data points, by reducing the number of time-amplitude data for each frequency band, and removes the unwanted time-amplitude data points.

In one implementation, the data reduction 608 utilizes the Ramer-Douglas-Peucker data reduction algorithm in order to minimize the amount of time-amplitude data points to a manageable proportion. In different implementations, the data reduction algorithms can implement piecewise linear approximation methods such as, but not limited to, RLS (recursive least square), Visvalingam-Wyatt, differential evolution, Broyden-Fletcher-Goldfarb-Shanno (BEGS), gradient descent and other known techniques.

In some embodiments, the envelope smoother 606 and the data reduction 608 can be combined to form an envelope smoother and data reduction implementing algorithms that perform both smoothing and reduction of data simultaneously.

The audio analysis module 206 produces an analyzed audio descriptor data, which includes a frequency band descriptor data derived from each frequency band. Each frequency band descriptor data comprises the center frequency, the bandwidth, and the reduced time-amplitude envelope having time-amplitude values.

Figure 7:
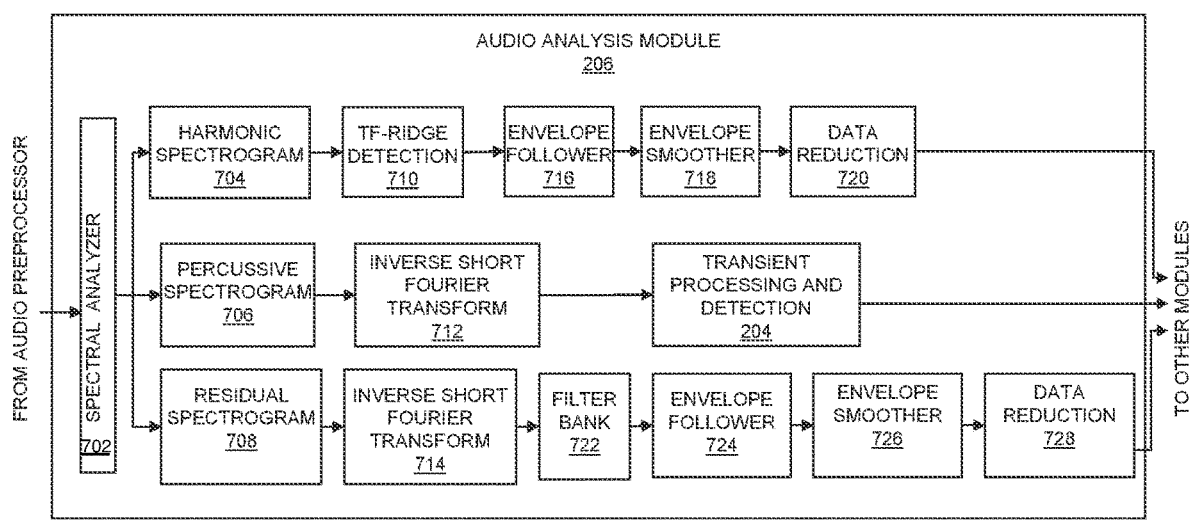
FIG. 7 illustrates different parts of the audio analysis module in an alternate embodiment of the present invention.

FIG. 7 illustrates the different parts of the audio analysis module implementing spectrogram analysis using a harmonic component and a percussive component. In this embodiment, the residual component is not used and the audio analysis module uses only the harmonic component and the percussive component to produce an output.

The preprocessed audio signal is provided to a spectral analyzer 702, which produces a frequency power spectrogram. The spectral analyzer 702 converts the received signal into the frequency domain by performing a Fourier transform, such as a Short Time Fourier Transform (STFT) to generate a power spectrogram. The power spectrogram created by the spectral analyzer 702 is then passed through a median filtering process for separating the filtered harmonic spectrogram and the filtered percussive spectrogram, which are utilized to compute the binary masks necessary to derive the harmonic spectrogram 704 and the percussive spectrogram 706. The spectrogram shows the frequencies along the vertical axis (y-axis) and the time along the horizontal axis (x-axis). In addition, the power of specific frequency is shown along the frequency-time graph along the x-y axis with the black color density showing the energy/power for that specific frequency.

In another variation of this implementation, the center frequency value is not calculated, instead the whole array of time-frequency values is stored and provided to the authoring tool 208 for signal processing through the user interface. For each frequency band, the array of time-amplitude values is converted into a time-amplitude envelope by an envelope follower 716. The time-amplitude envelope is converted into a smoothed time-amplitude envelope by an envelope smoother 718. The time-amplitude values of the smoothed time-amplitude envelope is reduced in size by a data reduction 720 without losing signal information. The data reduction 720 produces a reduced time-amplitude envelope.

Finally, the data reduction 720, which comprises information related to multiple frequency bands produces a series of audio descriptor data comprising a frequency band descriptor data. The series of frequency band descriptor data includes frequency description data for each frequency band. Each frequency band descriptor data includes information about the center frequency, the reduced time-amplitude envelope, the time-amplitude values, and bandwidth.

In one variation of this implementation, the audio analysis module 206 has a memory and a processor.

In a variation of this implementation, the audio analysis module 206 calculates a Short Time Fourier Transform (STFT) for a fixed window of audio packets to calculate the spectrogram. In another variation of this implementation, the audio analysis module 206 calculates a Short Time Fourier Transform (STFT) for a variable window of audio packets to calculate the spectrogram. The spectrogram is utilised to derive the harmonic component and the percussive component.

The harmonic spectrogram 704 and the percussive spectrogram 706 can be processed separately. Alternatively, in another implementation, the harmonic spectrogram 704, the percussive spectrogram 706 and the residual spectrogram can be separately processed and provided to the authoring tool 208 for further analysis.

The percussive spectrogram 706, which is derived from the median filtering of the power spectrogram is passed to the Inverse Short Fourier Transform MSFT) to determine the transients. The transients are then passed to the transient processing and detection module 204, which analyzes the transients. The transients are provided to the user interface in the authoring tool 208. In some embodiments, the transient processing and detection module 204 may determine the transient binary score from the percussive spectrogram 706.

The analysis of each frequency band comprising time-amplitude values or time-frequency values or time-amplitude-frequency values can be performed either in the time domain or the frequency domain. In addition, the noise component can be converted into a time-amplitude envelope, in one variation can be displayed in the time authoring tool 208 as residual noise. In some embodiments, the residual noise can be shaped through the authoring tool 208.

Subsequently, the analyzed audio descriptor data from the audio analysis module 206 is provided to the authoring tool 208 and the transformation module 210.

In another embodiment, the audio analysis module may implement the harmonic component, the percussive component, and a residual component as shown FIG. 7. In this implementation, the audio analysis module 206 calculates the residual component by subtracting the harmonic component and the percussive component from the original spectrogram. When the Inverse Short Time Fourier Transform (ISTFT) of the residual component is performed, the residual component can be calculated. The residual component is the noise, which can be separately provided to the authoring tool 206. The authoring tool 206 can modify and re-shape the noise component.

The residual path comprises the residual spectrogram 708 an inverse short Fourier transform 714, an envelope follower 724, an envelope smoother 726, and a data reduction 728. The preprocessed audio signal is provided to a spectral analyzer 702. The spectral analyzer 702 converts the received signal into the frequency domain by performing a Fourier transform, such as a Short Time Fourier Transform (STFT) to generate a power spectrogram. The power spectrogram calculated by the spectral analyzer 702 is then passed through a median filtering process for separating a harmonic component and a percussive component to compute the binary masks needed in order to derive the harmonic spectrogram 704 and the percussive spectrogram 706. Alternatively, the harmonic spectrogram 704 can be derived from the median filtering of the power spectrogram, which is directly utilised for a time-frequency-ridge (IF-ridge) detection. The harmonic spectrogram 704 is passed through a IF-Ridge detection 710. The IF-Ridge detection 710 analyzes the harmonic spectrogram 704 to create an array of time-amplitude envelopes comprising time-amplitude values for one or more frequency bands. The bands of frequencies are predefined, such as 20-60 Hz, 60-120 Hz, 120-200 Hz, and 200 Hz-1 kHz. For each band, the TF-Ridge detection 710 analyzes all frequencies of that band within the harmonic spectrogram 704 and extracts a single maximum-energy in the time-frequency ridge, which is an array of time-frequency data points and time-amplitude values.

The harmonic spectrogram 704 and the percussive spectrogram 706 are added to calculate the sum of the harmonic-percussive components. The sum of harmonic-percussive components is subtracted from the power spectrogram to calculate a residual spectrogram 708. The residual spectrogram 708 represents the noise signal. The harmonic spectrogram 704 produces a spectrum of harmonics, the percussive spectrogram 706 produces a spectrum of transients, and the residual spectrogram produces the spectrum of noise in the received signal. For example, if the original spectrogram from the spectral analyzer 702 in the frequency domain is O(f) and the harmonic spectrogram 704 is H(f) and the percussive spectrogram 706 is P(f) then the residual signal is obtained by R(f)=O(f)−(H(f)+P(f)). The processing of the harmonic spectrogram 704 and the percussive spectrogram 706 is performed as discussed earlier.

The harmonic spectrogram 704 is passed through a IF-Ridge detection 710. The IF-Ridge detection 710 analyzes the harmonic spectrogram 704 to create an array of time-amplitude envelope comprising time-amplitude values for one or more frequency bands. The bands of frequencies are predefined such as 20-60 Hz, 60-120 Hz, 120-200 Hz, and 200 Hz-1 kHz. For each frequency band, the TF-Ridge detection analyzes all frequencies within that specific frequency band and extracts a maximum-energy ridge for each of the frequency bands. For each frequency band, a center frequency value is calculated by taking the median of all the frequency values of the specific frequency band from the array of time-frequency values.

The percussive spectrogram 706, which contains the transient component is passed into an Inverse Short Fourier Transform (ISM 712 to convert the percussive spectrogram 706 into a time-amplitude envelope with time amplitude values. The time amplitude values are passed to the transient detection and processing module 204 for further processing of the transient signal.

The residual spectrogram 708 is passed through an Inverse Short Fourier Transform (ISFT) 714 to convert the residual time frequency values into time-amplitude values. The time-amplitude values are processed in the filter hank 722, which separates the received signal into different frequency bands as described in FIG. 6. The different frequency bands are then converted into a time-amplitude envelope comprising time-amplitude values by the envelope follower 724, the time-amplitude envelope is then passed to the envelope smoother 726, which smoothes the time-amplitude envelope. The number of time-amplitude values are reduced by the data reduction 728. Finally, the reduced time-amplitude envelope comprising time-amplitude values can be directly provided to the authoring tool 208 and other modules or alternatively provided to the user interface of the authoring tool for modelling the time-amplitude values. The data reduction 728 produces an analyzed audio descriptor data, which comprises frequency band descriptor data for different frequency bands; for each frequency hand the frequency descriptor data includes the center frequency and the bandwidth. In addition, an alternate implementation, the data reduction 728 produces an output, which comprises multiple frequency bands having a bundle of frequency band descriptor data for different frequency bands; for each frequency band, the frequency descriptor data includes the center frequency of the specific band, the bandwidth of the specific band, time-amplitude values of the specific frequency band.

Figure 8:
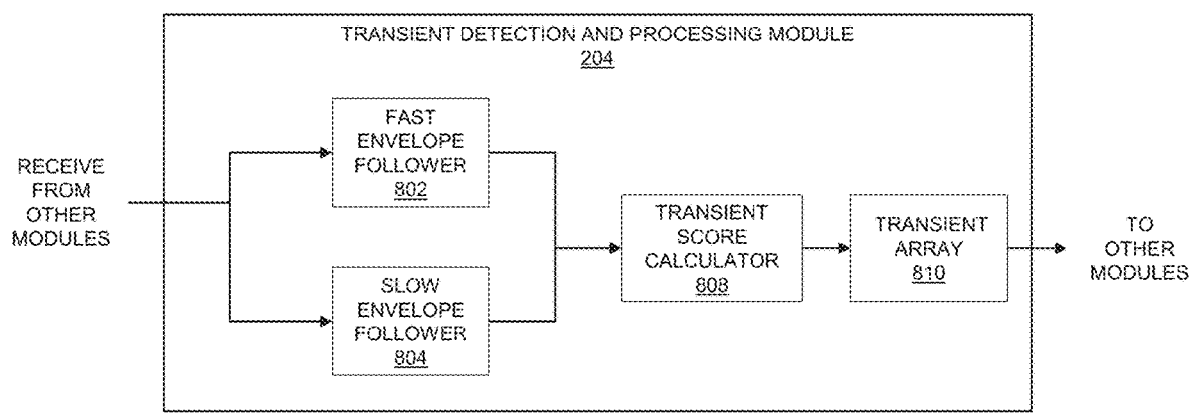
FIG. 8 illustrates different parts of a transient detection and processing module in an embodiment of the present invention.

FIG. 8 illustrates the various parts of the transient detection and processing module in an embodiment of the present invention. The transient detection and processing module 204 includes a fast envelope follower 802, a slow enveloper follower 804, a transient score calculator 808, and a transient array 810 apart from other modules. The transient detection and processing module 204 detects the transients in the received audio signal. The transients are a short burst of energy caused by a sudden change of state of the energy in sound characteristics with a non-harmonic attack phase. Furthermore, the transients have a high degree of non-periodicity with high magnitudes of high frequencies.

The transient detection and processing module 204 calculates the transient descriptor data from the received audio signal. The transient detection and processing module 204 passes the received audio signal to the fast envelope follower 802 and the slow envelope follower 804, and the transient score calculator 808 calculates the difference in output values between the fast envelope follower 802 and the slow envelope follower 804. The difference of the fast envelope follower 802 and the slow envelope follower 804 is preferably in decibels (dB) and is utilized to calculate a transient score. The transient detection and processing module 204 also receives a transient threshold. In embodiments, the transient threshold is provided by the transient detection and threshold module 204 or it can be calculated in a transient analysis detection module. Subsequently, a transient binary is determined based on the transient score. The transient binary is a binary value, which is either one (1) or zero (0); the transient binary is based on the transient score. In embodiments, the transient binary is directly proportional or inversely proportional to the transient score. If the transient score is above the transient threshold, the transient binary is set to one (1) otherwise the transient score is set to zero (0). A transient output is calculated by multiplying the transient binary with the transient score. The transient score is calculated for the received audio signal, and the time-transient scores are stored in the transient array 810. The transient descriptor data, which is derived from the transient array is passed to the authoring tool 208 and the transformation module 210. The transient processing is described in details in the U.S. application Ser. No. 16/435,341 filed on Jun. 7, 2019, which is incorporated here by reference.

The fast envelope follower 802 and the slow envelope follower 804 can be implemented either as a hardware or a software or a combination of hardware and software. In the software implementation, the fast envelope follower 802 is implemented by a fast attack time, for example, an attack time of 1 ms, and a fast release time, for example, a release time of 10 ms. Similarly, the slow envelope follower 804 is implemented with a slow release time, for example, a release time of 2500 ms. In this implementation, the fast attack time and the fast release time will enable the fast envelope follower 802 to follow the input waveform. The fast envelope follower 802 approximates the replica of the input signal. Likewise, the slow envelope follower 804 implements the slow release time enabling the slow envelope follower to initially follow the rise of the waveform but the fall time will be slow, which results in a ramp type decay. In another variation, the fast envelope follower 802 and the slow envelope follower 804 are implemented as a hardware. One way of achieving this hardware implementation is using small capacitor values for the fast envelope follower and large capacitor values for the slow envelope follower. Other implementations are possible using integrated circuits, timing circuits and MOSFETs.

In a variation of this implementation, the transient detection and processing module 204 can be embedded within the audio analysis module 206 and a transient score is provided to the authoring tool 208 and the transformation module 210 for processing of the transient descriptor data.

Figure 9:
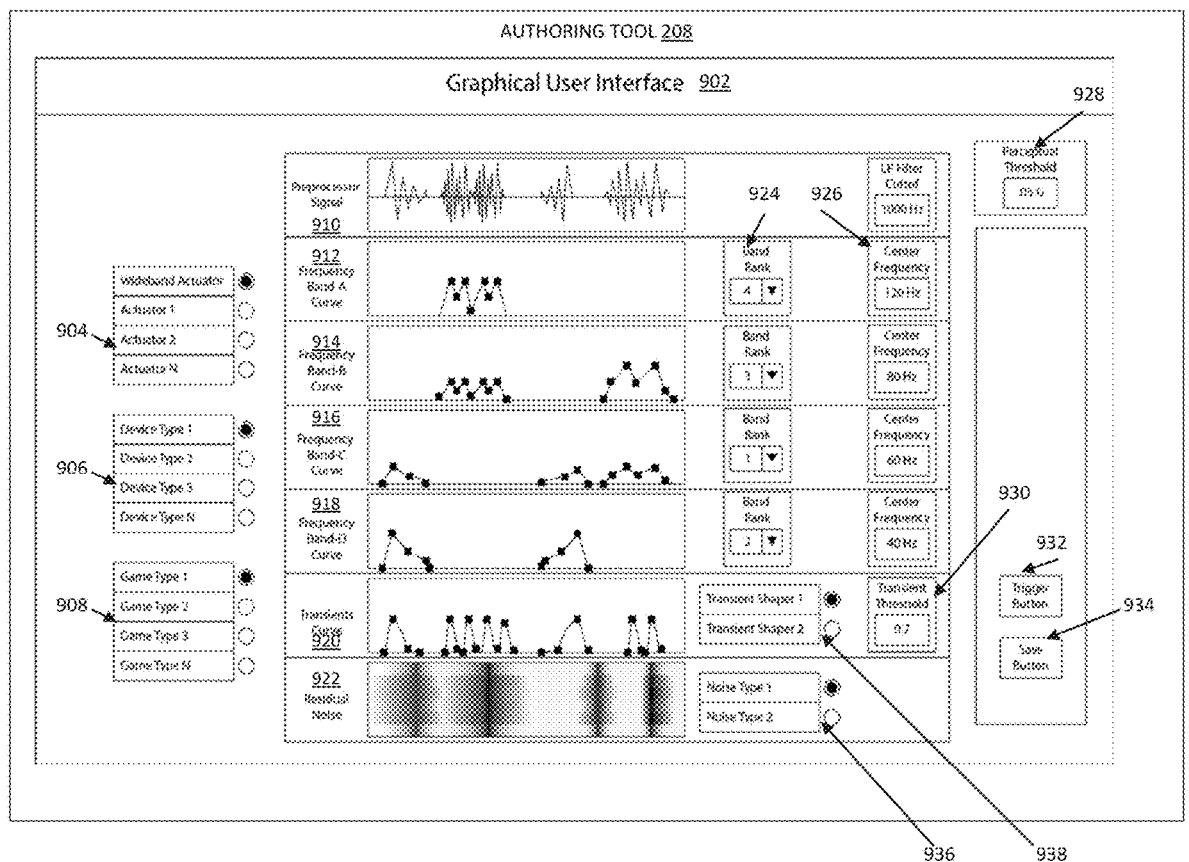
FIG. 9 illustrates a graphical user interface in the authoring tool in an embodiment of the present invention.

FIG. 9 illustrates a graphical user interface 902 associated with the authoring tool in an embodiment of the present invention. The authoring tool 208 can be implemented on the electronic computing device 102. In other implementations, the authoring tool can be located in the cloud computing environment 140, the server 160, or the distributed environment 150.

In one variation of this implementation, the authoring tool 208 includes an integrated processor with an integrated memory. The graphical user interface 902 allows the user to view, analyze and modify the analyzed audio descriptor data from the audio analysis module 206 and the transient descriptor data from the transient detection and processing module 204. Additionally, the graphical user interface 902 allows the user to view the preprocessed audio signal from the audio preprocessor module 202.

The graphical user interface 902 displays an audio preprocessed signal 910 as a plot of the preprocessed audio waveform. Additionally, the graphical user interface 902 displays curve editors for different frequency bands, that is, at least one curve editor for one frequency band. In a current implementation, the graphical user interface 902 comprises a curve editor 912 for a high frequency band, at least two mid frequency bands that is a curve editor 914 and a curve editor 916, and a curve editor 918 for a low frequency band. The curve editors 912-918 display the time-amplitude envelopes comprising time-amplitude values. The time-amplitude envelopes comprising time-amplitude values are editable and can be modified by dragging a mouse or dragging a stylus on a touch screen, or using a gesture-capturing device to either stretch, compress, drag, drop or modify the time-amplitude value for each of the frequency bands. For example, each time-amplitude value of each frequency band can be separately edited to a new value, which is different from its current time-amplitude value. Likewise, all the time-amplitude values of the time-amplitude envelopes for each frequency band can be edited to modify the time-amplitude values for authoring immersive haptic experience according to the combined bandwidth of the electronic computing device 102 with an embedded actuator 122. Additionally, the graphical user interface 902 can be utilised for adding or deleting time-amplitude values in the time-amplitude envelopes. For example, the author may add one or more additional time-amplitude values to each of the time-amplitude envelopes. Likewise, in another example, the author may delete one or more additional time-amplitude values from each of the time-amplitude envelopes.

In another variation of this implementation, the graphical user interface 902 can modify, edit, add or delete the time-frequency envelopes comprising time-frequency values. Accordingly, the graphical user interface 902 can be adapted for performing the authoring of the analyzed audio descriptor data and the transient descriptor data in the frequency domain. In yet another variation, the graphical user interface 902 can be adapted to edit, modify, add or delete the time-frequency-amplitude of the analyzed audio descriptor data and the time transient descriptor data.

In addition, the graphical user interface 902 also provides a noise curve editor 920 for displaying the transient descriptor data. Additionally, the transient descriptor data can be modified and/or edited using the noise curve editor 920 to redefine the transient curve(s). For example, the user can drag the transient curve with a mouse to reshape the transient curve. Alternatively, the transient curve can be reshaped by selecting a radio button 938. By selecting the appropriate radio button 938, the user can shape the transients from a list of transient shapers, such as but not limited to transient shape 1, transient shaper 2, for example, selecting the appropriate transient shape for a list transient curves.

The residual noise editor 922 allows the editing of the noise component received from the data reduction 728. The residual noise can be modified by selecting a radio button 936; each radio button 936 provides a specific type of noise shaping, for example, selecting a first radio button 936 provides the first type of noise shaping. In an alternate variation of the present implementation, the residual noise editor 922 can be edited by dragging the time-amplitude values for shaping the noise curve. In some embodiments, the time-amplitude-frequency values may be edited for shaping the noise component.

The graphical user interface 902 includes a combo box with a selection button 904 is utilised for selecting the actuator 122 or the type of actuator, for example, a linear resonant actuator, a piezo-electric actuator, a wideband actuator or other type of actuator. In addition, the graphical user interface includes a combo box 906 for selecting the type of electronic computing device, for example, the electronic computing device 102 can be a tablet, a joystick, a gamepad or a mobile phone through a selection of a radio button. The contents of the combo box with selection button 904 can be populated by accessing the memory 104 of the electronic computing device 102. In another implementation the contents of the combo box 904 can be populated by querying the database 220. Likewise, the combo box 906 can be populated by accessing the memory 104 of the electronic computing device 102 or by querying the database 220.

The graphical user interface 902 further includes an array of drop-down menus 924 for assigning a frequency band rank to each frequency band during authoring of the analyzed audio descriptor data. In one implementation, the values in the array of drop-down menu boxes 924 may range from 0 to X, where X is the total number of frequency bands. The default value is set to Zero (0), which corresponds to no preference to any of the frequency bands. In this implementation, when the default value has been assigned the artificial intelligence module 216 may implement algorithms to rank different frequency bands based on deep learning algorithms. In another implementation, the graphical user interface 902 may allow a user to rank frequencies by dragging and dropping the different graphical elements such as 912-918. For example, the graphical element frequency band A curve 912 can be dragged and moved to replace frequency band D curve 918.

When the values in one of the drop-down menu boxes is set to one (1), it corresponds to the highest rank whereas and the lowest preference being the number X, which is equal to the number of frequency bands. In addition, an array of text boxes 926 is provided for setting the center frequency of each frequency band. The default values of the text boxes 926 are set by reading the center frequency value for each frequency band, which is received from the audio analysis module 206. Alternatively, the center frequency can be changed by entering new center frequency values for each frequency band. For example, the array of drop-down menus 924 and the array of textboxes 926 are used to set the frequency band rank and the center frequency of the high frequency band A curve 912, a frequency band B curve 914, a frequency band C curve 916, and the low frequency band D curve 918. In addition, in some embodiments, the parameters associated with different frequency bands can be edited or modified by the user, for example, the lower and upper cut-off frequency for a particular frequency band.

The graphical user interface 902 provides additional graphical components to enhance the haptic experience. The graphical user interface 902 includes a perceptual threshold textbox 928 to set the perceptual threshold value. Similarly, the graphical user interface 902 includes a transient threshold textbox 930 to set a transient threshold value. The value of the transient threshold text editor box 930 can range from 0.0 to 1.0.

A trigger button 932 in the graphical user interface 902 allows all the haptic events to be recorded and buffered as events and subsequently saved using the save button 934. A save button 934 allows the user to save all the modifications made to each frequency band of the analyzed audio descriptor data through the curve editors 912-918, the frequency band rank values through the frequency band rank drop-down menu 924 and the center frequency values through the center frequency text editor 926 as an authored audio descriptor data. In addition, customizations made by the user to the transient descriptor data through the transient curve editor 920 are saved as an authored transient descriptor data. In addition, the actuator ID value received from the combo box with the selection button 904, the device ID value received from the combo box with the selection button 906, and the perceptual threshold value of the perceptual threshold text box 928 are saved into other authored data. The authored audio descriptor data, the authored transient descriptor data and the other authored data are passed to the transformation module 210 for further processing.

The graphical layout of different components on the user interface 902 as illustrated in FIG. 9 is exemplary and provides one of the several implementations. In other implementations, the graphical user interface 902 can have additional or lesser number of graphical components arranged in a different layout using different graphical components such as drop down menus, radio buttons and some other type of graphical components.

Figure 10:
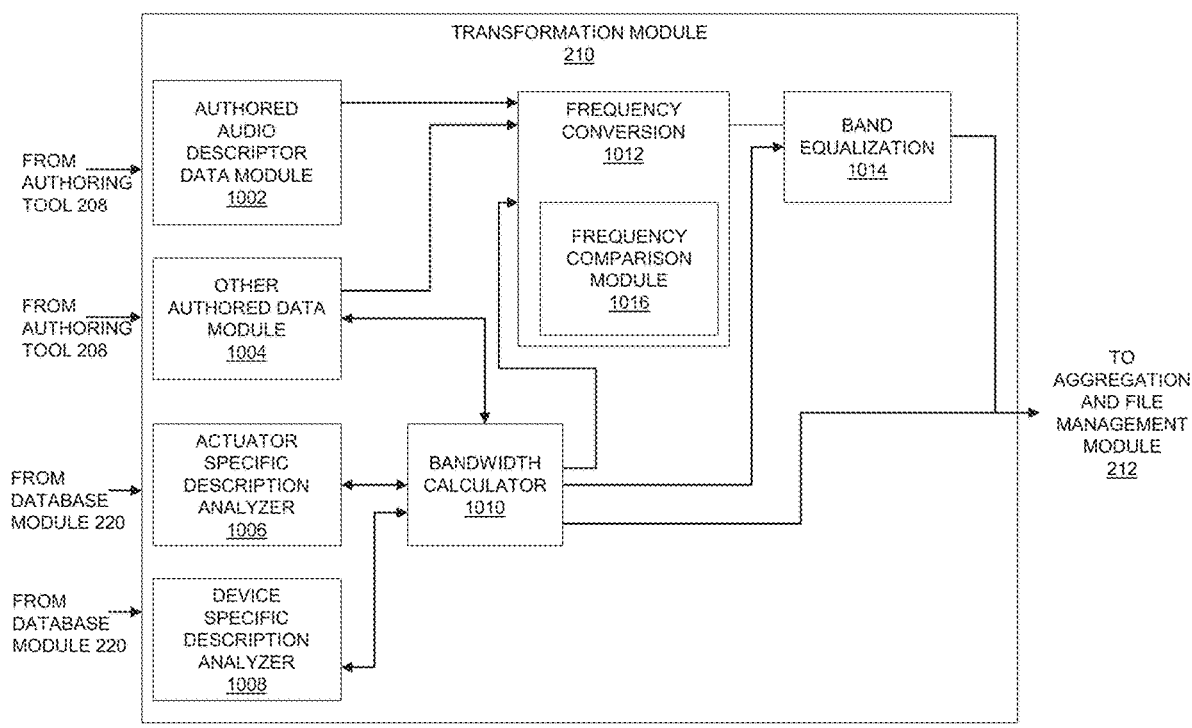
FIG. 10 illustrates different parts of a transformation module in an embodiment of the present invention.

FIG. 10 illustrates the different parts of a transformation module in an embodiment of the present invention. The transformation module 210 transforms the authored audio descriptor data into a transformed audio descriptor data. The authored audio descriptor data is accommodated into the haptic perceptual bandwidth of the electronic computing device 102 having embedded actuator 122. For example, the electronic computing device 102 may have different types of actuators such as but not limited to piezoelectric actuator, voice coil actuator or some other type of actuator. The transformation module 210 implements one or more algorithms to fit the authored audio descriptor data into the haptic perceptual bandwidth. The one or more algorithms may determine the center frequency and the spectral energy of each frequency band for fitting the authored audio descriptor data into the haptic perceptual bandwidth.

The transformation module 210 includes an authored audio descriptor data module 1002 configured to receive the authored audio descriptor data and other authored data module 1004 configured to receive the other authored data, for example, perceptual data such as a perceptual threshold value, perceptual bandwidth and other information, which has been edited or changed by the user through a user interface in the authoring tool 208.

In addition, the transformation module 210 includes an actuator specific description file analyzer 1006 for analysing the actuator specific information 222 from the database module 220. Further, the transformation module 210 includes a device specific description file analyzer 1008 for analysing the device specific information 224 received from the database module 220. In some embodiments, the transformation module 210 may receive the content information 226 from the database module 220.

The authored audio descriptor data module 1002 and the other authored data module 1004 are connected to a frequency conversion module 1012. The frequency conversion module 1012 includes a frequency comparison module 1016.

A bandwidth calculator module 1010 receives information from the actuator specific description file analyzer 1006, the device specific description file analyzer 1008, and the other authored data module 1004 to calculate the haptic perceptual bandwidth of the electronic computing device 102 having at least one actuator 122. In some embodiments, the bandwidth calculator module 1010 may recalculate the haptic perceptual bandwidth of the electronic computing device 102 having at least one actuator 122 if the haptic perceptual bandwidth has been provided earlier. The bandwidth calculator 1010 calculates and provides the frequency and the amplitude response over which the humans can experience haptic vibrations. The haptic perceptual bandwidth lies in between a first threshold TH1 and a second threshold TH2. The first threshold TH1 is the lower cut-off frequency and the second threshold TH2 is the upper cut-off frequency over which the vibration can be felt by humans. The haptic perceptual bandwidth, which lies between the first threshold. TH1 and the second threshold TH2 is not fixed, but can vary based on different parameters such as but not limited to individual experiences, specific thresholds to haptic vibrations at specific frequencies, specific sensitivity to haptic vibrations based on parts of the body, non-linear sensitivities to specific vibrations, and other parameters.

The transformation module 210 queries the database 220 through the other authored data module 1004, which includes an actuator ID, a device ID, the other information related to the electronic computing device 102 embedded with the actuator 122 or the actuators 410-418. As discussed, the other authored data includes information related to device ID, actuator ID, which are included during the authoring process. For example, the transformation module 210 sends a request to the database module 220 for querying the actuator specific information 222 and the device specific information 224 by passing the actuator ID and the device ID as parameters. The database module 220 extracts the relevant information and provides the results to the transformation module 210. The bandwidth calculator module 1010 may calculate the haptic perceptual bandwidth of the actuator 122 embedded in the electronic computing device 102. The bandwidth calculator module 1010 may calculate the haptic perceptual bandwidth of the electronic computing device 102 for different types of actuators 410-418. The haptic perceptual bandwidth may be calculated with each of the actuators 410-418 and the electronic computing device 102. In addition, the haptic perceptual bandwidth may be calculated for all the actuators 110-418 combined together and acting as a single unit.

In some embodiments, the device specific information 224 contains specification data or characteristic data such as the measured bandwidth, which is the frequency response of specific actuators, such as the actuators 410-418 associated with the electronic computing device 102. When the device specific information 224 contains no specification data or characteristic data of the actuator 122 or the actuators 410-418, then the bandwidth calculator 1010 determines the bandwidth of the actuator 122 and the electronic computing device 102 by calculating the bandwidth using specification data provided in the actuator specific information 222 such as mass of the actuator, the attached additional mass to the actuator, the frequency response with and without attached mass stored in the database module 220 to determine the frequency response of the actuator 122 along with the mass of the electronic computing device 102 referred as available bandwidth.

In some embodiments, the bandwidth calculator module 1010 may pass the calculated haptic perceptual bandwidth to the other authored data module 1004.

When the haptic module 110 is implemented in the electronic computing device 102, the transformation module 210 utilizes the processor 114 and the memory 104. However, in other embodiments, when the haptic module 300 resides in a distributed system 150 or network 302, the transformation module 210 includes the processor 312 and an associated memory.

The frequency conversion module 1012 includes a frequency comparison module 1016, which checks if the center frequency of each of the frequency bands received from the authored descriptor data module 1002 can fit within the haptic perceptual bandwidth. If the center frequencies of each frequency band can fit within the haptic perceptual bandwidth, the authored descriptor data is sent directly to a band equalization module 1014. The band equalization module 1014 increases or decreases the time-amplitude values of the received authored descriptor data to normalise each frequency band to provide a evenly distributed wide band frequency response to the electronic computing device 102 having the actuator 122 or the electronic computing device 102 associated with the actuators 410-418.

The band equalization module 1014 receives the authored audio descriptor data comprising each authored frequency band and the center frequency from the frequency conversion module 1012. Further, the band equalization module 1014 also receives an input from the bandwidth calculator module 1010. The band equalization module 1014 compensates for the non-linear frequency response curve of the actuator such as the actuator 122. For example, if a specific frequency in the authored audio descriptor data is far off or separated by a large frequency gap from the resonant frequency and has a lower acceleration force, the amplitude values of the time-amplitude envelope for this frequency are increased, so that the actuator 122 creates a flatter acceleration response for these ranges of frequency. In short, the band equalization 1014 produces a flatter acceleration response to enable wideband distribution of haptic output over all frequency ranges.

In some embodiments, the band ranking of each frequency is passed to the band equalization module 1014, which can then decide to boost high ranked frequency bands and attenuate the low ranked frequency bands according to the rank of each frequency band.

If the authored audio descriptor data cannot fit within the range of the haptic perceptual bandwidth, then the frequency comparison module 1016 checks if a frequency band ranking has been provided in the authored audio descriptor data or in the other authored data if the frequency band ranking is provided in the authored audio descriptor data then the frequency comparison module 1016 passes the frequency band ranking provided in the authored audio descriptor data to the bandwidth comparison module 1016. The bandwidth comparison module 1016 then ranks the frequency bands in the order of the rank of each frequency band with highest ranked frequency getting the highest priority. The transformation module 210 then tries to fit the maximum number of frequency bands into the haptic perceptual bandwidth in decreasing order of band ranking. The frequency bands that cannot fit in the haptic perceptual bandwidth are discarded. For example, if two frequency bands can only fit within the haptic perceptual bandwidth then other frequency bands are removed.

However, if no frequency band ranking is provided in the authored audio descriptor data for different frequency bands then the frequency conversion module 1012 initiates a process of ranking the different frequency bands based on a mean square envelope energy content and distance of the center frequency of each band from the resonant frequency of the electronic computing device 102 having embedded actuator 122. For example, the mean square envelope energy content can be calculated for envelope $E_N(t)$ having N frequency bands with t being an individual timestamp/breakpoint and $E(t) \in [0.0, 1.0]$—so that max(Mean Square (MS))≤1.0 and $T_N$ being the total amount of timestamps/breakpoints for each component $$MS_N = \sqrt{\frac{\sum_{T_N}^{t=0} E_N(t)^2}{T_N}}$$

and then ranked with the highest being the one with the highest mean square energy content MS.

In one variation of this implementation, the process of ranking the different frequency bands based on average envelope energy content of each frequency band.

In another variation of this implementation, the process of ranking the different frequency bands is based on the maximum envelope energy of each frequency band.

In another variation of this implementation, the process of ranking the different frequency bands based on the center frequency of each frequency band.

Next, the distance between the resonant frequency $f_0$ of the electronic computing device 102 having an embedded actuator 122 and $f_N$ corresponds to the center frequency of the N th frequency band, where N=1, 2, 3, . . . is determined by using the following formula $\Delta f_0 = \sqrt{(f_0 - f_N)^2}$. The determined distance for each frequency band is scaled to be on a weighting interval of $$w_{\Delta f_0} \in [0.0, 1.0] \text{ by } w_N = 1 - \frac{\Delta f_0}{\Delta_{max}}$$

with $\Delta_{max}=BW \cdot 0.5$ being the actuators half bandwidth (BW). Finally, the weighting is applied to each component by: $wMS_N=w_N \cdot MS_N$. This gives the ranking of each frequency band.

Once the mean square envelope energy content and the center frequency of each frequency band has been computed, the frequency conversion module 1012 then tries to fit each of the frequency band into the haptic perceptual bandwidth based on ranking performed to a combination of the mean square envelope energy content and the scaled distance $\Delta f_0$.

In embodiments, different weights may be assigned to the mean square envelope energy content ranging between 0 and 1 in combination with the resonant frequency to determine the final ranking.

To illustrate with an example, given the center frequency of the first frequency band $f_{C_1}=35$ and the center frequency of the second frequency band $f_{C_2}=120$ Further, the resonant frequency of the electronic computing device 102 with embedded actuator 122 is $f_0=60$ and the perceptual haptic bandwidth is BW=200:

$$\Delta f_{C_1}=\sqrt[4]{(60-35)^2}=25$$

$$\Delta f_{C_2}=\sqrt[4]{(60-120)^2}=60$$

$$w_1=1-25/100=0.75 \in [0.0,1.0]$$

$$w_2=1-60/100=0.4 \in [0.0,1.0]$$

The example yields the weighted coefficients on the scale of [0.0, 1.0] that penalize distance from the center frequency based on the available bandwidth. A bigger distance (as for $\Delta f_{C_2} > \Delta f_{C_1}$) yields a smaller coefficient, giving its components less weight when ranking/comparing.

After weighted coefficients on the scale of [0.0, 1.0] have been calculated, the transformation module 210 initiates a process of mapping each frequency band in the haptic perceptual bandwidth. In some embodiments, the transformation module 210 maintains the pitch of each frequency component through harmonic variance.

Now each frequency band has been ranked. At this point, the frequency conversion module 1012 evaluates if all the ranked frequency bands can fit in the haptic perceptual bandwidth. If all the ranked frequency bands can fit into the haptic perceptual bandwidth then the frequency conversion module 1012 passes all the frequency bands to the band equalization module 1014 for further processing in the aggregation and the file management module 212.

If all the ranked frequency bands cannot fit into the haptic perceptual bandwidth then the frequency conversion module 1012 performs a frequency mapping process. The process of frequency mapping starts by a frequency alignment by evaluating if the center frequency of each frequency band is in fundamental alignment, that is, the center frequency of the lowest frequency band is aligned to the resonant frequency of the electronic computing device 102 having embedded actuator 122. If the fundamental alignment is satisfied, then the process of fundamental alignment starts by shifting the center frequency of the lowest frequency band to the resonant frequency of the electronic computing device 102 having embedded actuator 122. Likewise, the center frequency of other frequency bands by a shift scalar $$m_{shift} = \frac{f_0}{f_{C_1}}$$

where $f_0$ is the resonant frequency of the electronic computing device 102 having embedded actuator 122 and $f_{C_1}$ is the center frequency of the lowest frequency band. The shifted center frequency of each frequency band is determined by formula Center frequency band·$m_{shift}$=Shifted frequency band.

To illustrate with an example in an implementation using a logarithmically spaced filterbank arrangement from 30 to 120 Hz based on the Weber-Fechner law. Let the center frequencies of the following frequency bands be defined by an array [30.0, 39.58, 52.23, 68.92, 90.94, 120.0].

Let the resonant frequency of the electronic computing device 102 having embedded actuator 122 be $f_0=60$ and the center frequency of the lowest frequency band is $f_{c_1}=30$, then $$f_o = 60, f_{c_1} = 30, \frac{f_0}{f_c} = 2.$$

The center frequency of each frequency band will be shifted by $f_{N, shifted}=f_{N, original} \cdot 2$ In one variation of the fundamental frequency alignment, the shifting of frequency may be performed by shifting the center frequency of each frequency band by an octave. In one embodiment, the octave shift may be performed by moving the each frequency band to a higher octave frequency $f_{new}=2 \cdot f_{original}$. Alternatively, the octave shifting may be performed by transposing each frequency band down to a new lower frequency $f_{new}=0.5 \cdot f_{original}$.

In some embodiments, the octave shifting may involve the center frequency of the highest ranked band to remain unaltered whereas all the other frequencies are shifted by transposing up or transposing down with a fixed constant.

In one embodiment, the octave shilling may involve shifting the center frequency of the highest ranked band to the resonant frequency of the electronic computing device 102 having the embedded actuator 122.

In other embodiments, the octave shifting may involve shifting the center frequency and along with other frequencies of the highest ranked band to the resonant frequency of the electronic computing device 102 having the embedded actuator 122 whereas the other frequency bands are shifted by different values. For example, the transposing up or transposing down can in one example be performed by transposing the frequencies by one octave up or one octave down, which depends upon the direction of the original shifting of the frequency bands.

The value for transposing up or transposing down is based upon the direction of the shifting of each frequency band so as to fit into the haptic perceptual bandwidth. After the shifting of the center frequency and other frequencies of each of the frequency bands by one octave up or down, the frequency comparison 1016 determines if the frequency bands of the authored frequency band descriptor data shifted by one octave fits within the haptic perceptual bandwidth. If so, the bandwidth comparison 1016 passes the authored frequency band descriptor data to the band equalization 1014 for each frequency band for further processing. Otherwise, if the frequency bands of the authored frequency band descriptor data shifted by one octave do not fit within the haptic perceptual bandwidth, then the frequency bands of the authored frequency band descriptor data that do not fit within the haptic perceptual bandwidth are removed and the remaining frequency bands are passed to the band equalization 1014. The band equalization 1014 flattens and smoothes out the frequency response by boosting and/or attenuating frequency components as required.

In embodiments, the shifting of frequency performed by octave shifting the center frequency and other frequencies of each frequency band may depend upon the haptic perceptual bandwidth of the electronic computing device 102 having an embedded actuator 122.

If the fundamental frequency shift cannot be performed, the transformation module 210 performs the harmonic shift of the center frequencies of each frequency band. The harmonic shifting and sifting is performed by scaling the center frequency of each frequency band by an integer R or by an integer ratio $$\frac{1}{R}.$$

While performing harmonic shifting of center frequencies, the objective is to position the center frequency of each frequency band within the haptic perceptual bandwidth of the electronic computing device 102 having an embedded actuator 122.

In some embodiments, the center frequency of each frequency band may be harmonically shifted to derive a "superposition" of possible positions for the center frequency of each frequency band and discarding the center frequencies of frequency bands that do not fit within the minimum threshold cut-off of the haptic perceptual bandwidth and the maximum threshold cut-off of the haptic perceptual bandwidth.

In some embodiments, if no inherent harmonic relationship exists among the center frequencies of each frequency band then the lowest fundamental frequency is shifted to the resonant frequency of the electronic computing device 102 having embedded actuator 122 and the center frequencies of other frequency bands may be shifted based on an integer value or a perfect fraction to fit into the haptic perceptual bandwidth.

For example, the center frequencies of each frequency band may be shifted by using a Shift up formula such as $f_{new}=m_{shift} \cdot f_{original}$ or $f_{new}=f_{original}+b_{shift}$. In another example, the center frequencies of each frequency band may be shifted down by using formula:

$$f_{new} = \frac{1}{m_{shift}} \cdot f_{original} \text{ or } f_{new} = f_{original} - b_{shift}.$$

In non-harmonic shifting, the transformation module 210 ensures that a reasonable gap between two frequency bands is maintained to avoid a beat frequency.

In another variation of this implementation, the center frequency of the highest ranked frequency band is aligned with the resonant frequency of the electronic computing device 102 having an embedded actuator 122. Subsequently, all other frequency bands are shifted by $$m_{shift} = \frac{f_0}{f_{C_1}}.$$

Where $f_{C_1}$ is the highest ranked frequency band and $f_0$, is the resonant frequency of the electronic computing device 102 having an embedded actuator 122.

For example if the resonant frequency of the electronic computing device 102 having embedded actuator 122 is $f_0=126$ and the highest ranked component $C_1$ with the center frequency $f_{C_1}=42$ then $m_{shift}=126/42=3$. In this case, the center frequency of the highest ranked frequency band is shifted by a factor 3. Likewise, the center frequency of all other frequency bands are multiplied by $m_{shift}=126/42=3$ to evaluate the shifted center frequency of each frequency band. Accordingly, all the frequency bands are shifted by the factor $m_{shift}$.

The transformation module 210 passes the transformed audio descriptor data to the aggregation and file management module 212. In addition, the transformation module 210 also provides the other authored data including the haptic perceptual bandwidth to the aggregation and file management module 212.

Figure 11:
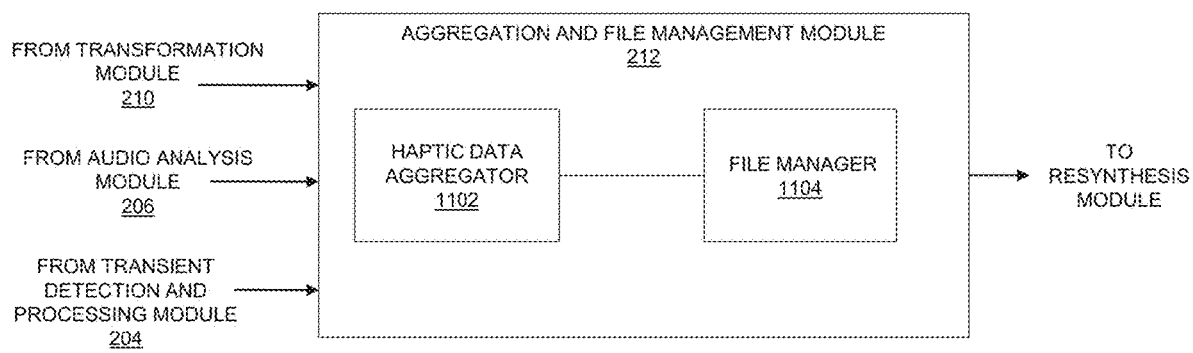
FIG. 11 illustrates different parts of an aggregation and file management module in an embodiment of the present invention.

FIG. 11 illustrates the different parts of the aggregation and file management module in an embodiment of the present invention. The aggregation and file management module 212 comprises a haptic data aggregator 1102 and a file manager 1104. The haptic data aggregator 1102 receives the transformed audio descriptor data and the other authored data from the transformation module 210. The haptic data aggregator 1102 then combines the transformed audio descriptor data and the other authored haptic data into the haptic data file, which is passed to a file manager 1104. The file manager 1104 receives the transformed audio descriptor data and the other authored data from the haptic data aggregator 1102 and converts the transformed audio descriptor data and the other authored data into multiple computer readable file format, which that can be utilized by the resynthesis module 214 for producing haptic output in one or more actuators, for example, the actuators 410-418. The file manager 1104 provides an option to save the haptic data file into different computer readable file formats for example, a text file, a JSON file, an XML file, a CSV file, or some other file format.

In one variation of this implementation, the aggregation and file management module 212 also receives the transient descriptor data from the transient detection and processing module 204, which is in addition to the transformed audio descriptor data and the other authored data received from the transformation module 210. The transient descriptor data, the transformed audio descriptor data and the other authored data are then combined by the haptic data aggregator 1102 into a haptic data file. The haptic data file is then passed to the file manager 1104 for converting the received data into different computer readable file formats for example, a text file, a JSON file, an XML file, a CSV file, or some other file format.

Figure 12:
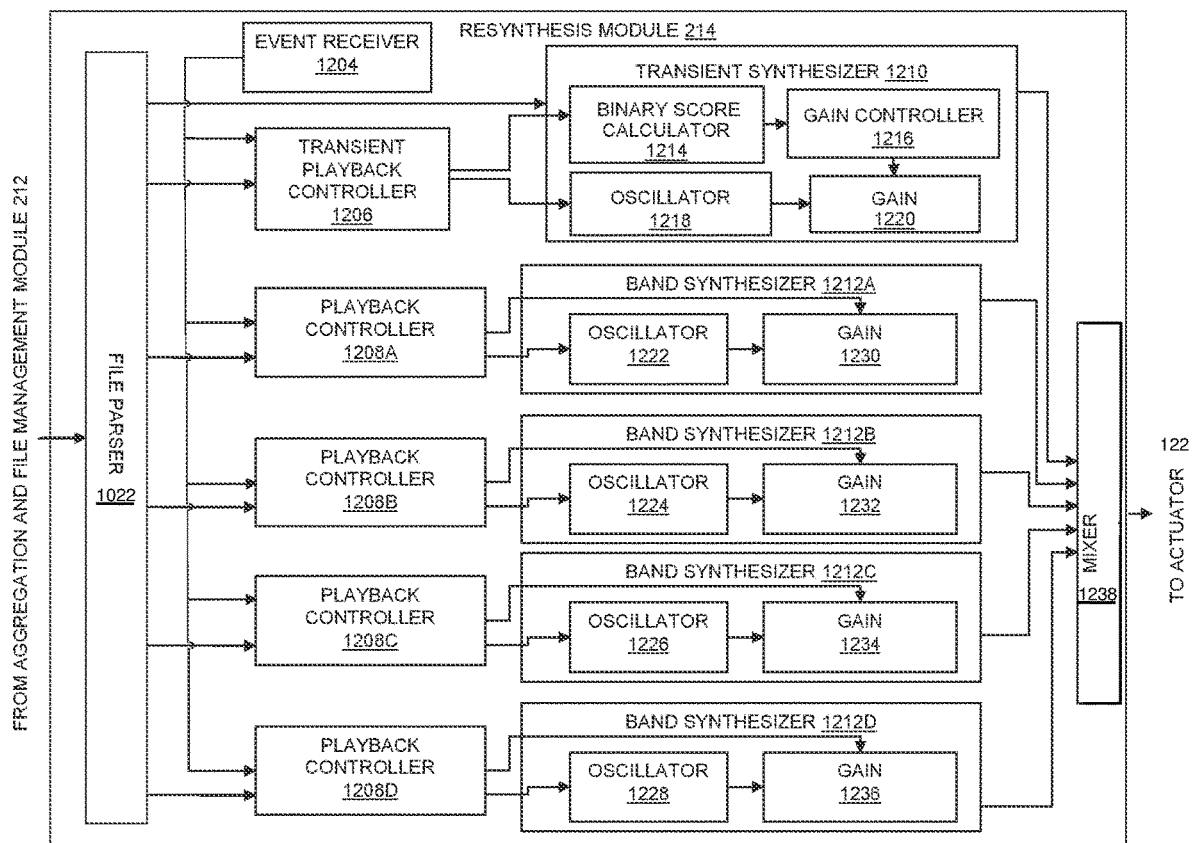
FIG. 12 illustrates different parts of a resynthesis module in an embodiment of the present invention.

FIG. 12 illustrates the different parts of a resynthesis module in an embodiment of the present invention. The resynthesis module 214 generates a haptic output signal from the haptic data file to drive the actuator 122. The haptic data file is received from the aggregation and file management module 212, which includes the transformed audio descriptor data and the other authored data.

In some embodiments, the resynthesis module 214 is directly connected to the transformation module 210 with some modifications. In this implementation, the transformed authored descriptor data and the other authored data is directly passed to the electronic computing device 102 having embedded actuator 122 to produce a haptic experience.

In some embodiments, the resynthesis module 214 may reside on a different device, which can play back the haptic data file, which has been authored using the authoring tool

208. The haptic data file is then provided to electronic computing device 102, which includes the resynthesis module 214. The resynthesis module 214 includes a computer readable medium to parse the haptic file to produce haptic experience through the actuator 122.

The resynthesis module 214 includes a file parser 1202, an event receiver 1204, a transient playback controller 1206 and a transient synthesizer 1210, apart from other parts. The file parser 1202 scans the haptic data file to extract the different frequency bands values including the frequency band with highest acceleration, the transient descriptor data and the other authored data is passed to the transient playback controller 1206. In preferred embodiments, the transient score threshold and the frequency are provided in the other authored data. The transient playback controller 1206 has a processor and a memory to store the transient score, the transient score threshold and the frequency associated with the frequency with the highest acceleration.

The transient synthesizer 1210 includes a binary score calculator 1214, a gain controller 1216, an oscillator 1218 and a gain 1220. The transient synthesizer 1210 produces transients based on the transient score and the transient threshold value provided in the authored transient descriptor data and the other authored data in the haptic data file. The oscillator 1218 is set to the frequency of the highest acceleration in the haptic perceptual bandwidth of the electronic computing device 102 having embedded actuator 122. Simultaneously, the file parser 1202 passes the transient score and the transient threshold to the binary score calculator 1214. The oscillator 1218 is connected to a gain 1220. The gain 1220 controls the amplitude of the sine wave of the oscillator 1218. The oscillator 1218 is a sine wave oscillator, but in other variations, other types of oscillators such as a square wave oscillator, a triangular wave oscillator, an impulse signal generators or predefined waveforms can be utilized for processing the transients.

The transient playback controller 1206 sets the transient threshold in the binary score calculator 1214 based on the transient threshold value provided in the haptic data file. Finally, the transient playback controller 1206 sets the frequency of the oscillator 1218 to the highest acceleration frequency of the haptic perceptual bandwidth provided in the transformed audio description data. The binary score calculator 1214 converts the time-transient score of the transient score into a transient binary score. The transient score envelope may range between 0.0 to 1.0. The transient binary score is either a 0 or 1 and it depends upon the transient threshold value. The transient threshold is a value between 0 to 1, for example, 0.7. When a time-transient score of the transient score is above the transient threshold value, the transient binary score value is set to 1, otherwise, the transient binary score value is set to 0. The transient binary score value is then passed to the gain 1220, which switches between on and off, thus either attenuating or passing the haptic signal generated by the oscillator 1218. The haptic signal generated from the time-transient score is then passed to a mixer 1238.

The resynthesis module 214 further includes one or more playback controllers 1208A-1208D and one or more band synthesizers 1212A-1212D. FIG. 12 illustrates an exemplary implementation with four playback controllers 1208A-1208D and four band synthesizers 1212A-1212D.

The four playback controllers 1208A-1208D include a playback controller 1208A, a playback controller 1208B, a playback controller 1208C and a playback controller 1208D. The playback controllers 1208A-1208D are connected with four band synthesizer 1212A-1212D. The playback controllers 1208A-1208D are connected to the file parser 1202 and the event receiver 1204.

Each band synthesizer 1212A-1212D includes an oscillator and a gain controller. For example, the band synthesizer 1212A includes an oscillator 1222 and a gain 1230. The oscillator 1222 generates a continuous signal based on haptic data received from the file parser 1202 for the tuned frequency band. Likewise, the other frequency bands are mapped to other playback controllers. Each playback controller 1208A-1208D is connected to one of the band synthesizers 1212A-1212D and each band synthesizer is tuned to a specific frequency band.

The file parser 1202 is connected to the playback controller 1208A and processes a specific frequency band, which is passed to the oscillator 1222. The oscillator 1222 is a sine wave oscillator and produces a frequency oscillation based on the data corresponding to the tuned frequency band. The gain 1230 also receives the transformed audio description data controls from the playback controller 1208A to modulate the amplitude of the frequency of the oscillator 1222. Likewise, the frequency band synthesizer 12123 comprise of a oscillator 1224 and a gain 1232; the frequency band synthesizer 1212C comprise of a oscillator 1226 and a gain 1234 and the frequency band synthesizer 1212D comprise of a oscillator 1228 and a gain 1236. The frequency band synthesizers 1212B-1212D perform the similar function for different frequency bands as performed by the band synthesizer 1212A.

The playback controllers 1208A-1208D set the oscillation frequency of the attached oscillators, for example, the playback controller 1208D sets the oscillation frequency of the oscillator 1228. Additionally, the file parser 1202 passes the time-amplitude envelope and the center frequency contained in the haptic data file to each of the frequency playback controllers 1208A-1208D.

In some embodiments, the frequency playback controllers 1208A-1208D have a processor and a memory to store the time-amplitude envelope and center frequency value for each of the frequency bands.

The resynthesis module 214 includes the event receiver 1204. The event receiver 1204 receives the trigger events from the file parser 1202, which scans the haptic data file to identify trigger events. Upon receiving the event trigger, the transient playback controller 1206 plays the stored transient score values at a scaled up rate by extrapolating intermediate signal data, for example at the rate of 44,100 samples per second. The transient playback controller 1206 passes the transient score values to the binary score calculator of the transient synthesizer 1210 which then produces transient output signal.

Simultaneously, upon receiving the event trigger from the event receiver 1204, the frequency playback controllers 1208A-1208D play, at a specified up-scaled rate, for example 44,100 Hz, the stored time-amplitude envelope of each frequency band. Referring to FIG. 6 and FIG. 7, the audio analysis module 206 implements data reduction to derive minimum number of time-amplitude data points for reproducing the time-amplitude envelope, the transient playback controller 1206 may interpolate between the time-amplitude values to extrapolate additional intermediate time-amplitude values to achieve up-scaled rate. The frequency playback controllers 1208A-1208D pass the extrapolated values to the gain 1230, the gain 1232, the gain 1234, and the gain 1236 in the band synthesizers 1212A-1212D in order to produce amplitude modulated sine waves at the center frequency of each frequency band.

In embodiments, the transient synthesizer 1210 provides additional emphasis to the amplitude of the haptic signal generated by the frequency band synthesizers 1212A-1212D to increase the intensity of the immersive haptic experience.

Referring back to FIG. 9, the haptic trigger button 932 in the GUI 902 of the authoring tool 208 may author trigger events, which can be processed in the transformation module 210 and stored in the haptic data file as transient description data. The haptic data file can scan and read the haptic data file to playback trigger events. Upon receiving the trigger event, the event receiver 1204 passes the trigger event along to the transient playback controller 1206 and the playback controllers 1208A-1208D for a synchronized playback.

The outputs from the gain 1220, the gain 1230, the gain 1232, the gain 1234 and the gain 1236 from the transient synthesizer 1210 and the frequency band synthesizers 1212A-1212D are passed to the mixer 1238. The mixer 1238 aggregates the outputs from the transient synthesizer 1210 and the band synthesizers 1212A-1212D to produce a haptic output. The haptic output drives the actuator 122 to generate the immersive haptic experience. Additionally or alternatively, the haptic output signal can be configured to drive additional actuators such as the actuators 410-418 for immersive haptic experience.

Although only four playback controllers 1208A-1208D and four frequency band synthesizers 1212A-1212D along with the transient synthesizer 1210 are shown in the exemplary embodiment, however, in other variations, there can be fewer or additional number of playback controllers 1208A-1208D and/or frequency hand synthesizers 1212A-1212D depending upon number of frequency bands. For example, in some embodiments, there may be one playback controller 1208A and one frequency band synthesizer 1212A with the transient playback controller 1206 and the transient synthesizer 1210.

In some embodiments, the oscillators 1222-1228 can be a square wave oscillator, sawtooth oscillator, triangular oscillator, a noise generator or some other type of oscillator.

In some embodiments, the frequency band synthesizers 1212A-1212D can include a gain controller, a variable frequency oscillator, a noise generator or a synchronization module configured to maintain synchronization between different frequency band synthesizers 1212.

In some embodiments, the binary score calculator 1214 is bypassed and the transient score is processed and directly provided to the gain 1220, which allows the gain 1220 to continuously attenuate or boost the signal of the oscillator 1218.

Figure 13:
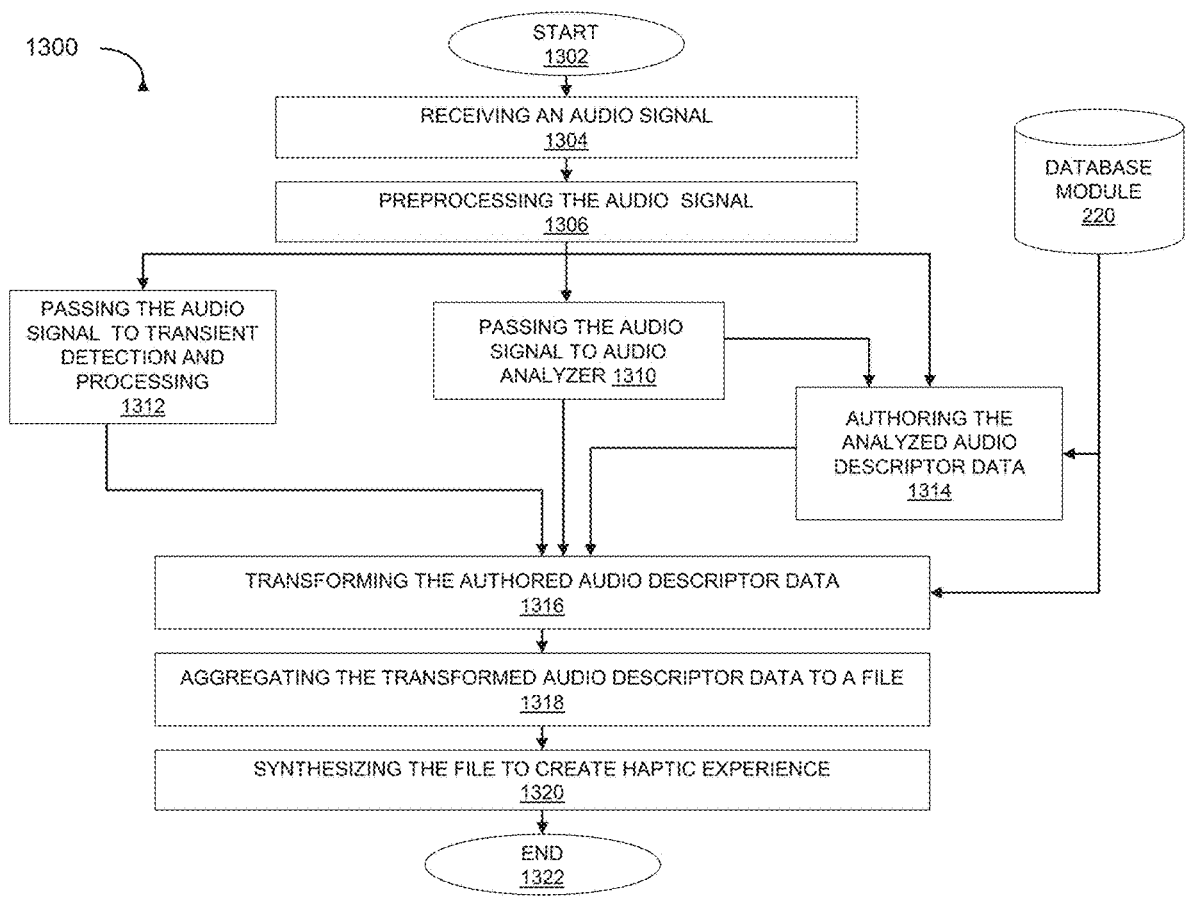
FIG. 13 illustrates a process flow diagram for converting an audio signal into a haptic signal an embodiment of the present invention.

FIG. 13 illustrates a process 1300 for authoring and transforming the audio signal to haptic signal in an embodiment of the invention. The process 1300 is initiated at step 1302. At step 1304, the process 1300 receives the audio signal 402, which can be stereo or mono audio. The audio signal 402 is passed to the audio preprocessor module 202 at step 1306. The audio preprocessor module 202 downsamples and removes any high frequency components from the audio signal 402. The preprocessed audio signal is passed simultaneously to the audio analysis module 206 at step 1310; the transient detection and processing module 204 at step 1312; and the authoring tool 208 at step 1314.

At step 1312, the transient detection and processing module 204 analyzes the preprocessed audio signal for the presence of transients and if transients are detected, it processes the transients, and passes the transient information to the authoring tool 208 as the transient descriptor data. In some embodiments, the transient detection and processing module 204 provides the transient descriptor data to the transformation module 208. The transient descriptor data comprising time-amplitude values corresponding to the transients.

At step 1310, the preprocessed audio signal is passed to the audio analysis module 206, which separates the signal into different frequency bands, analyzes each frequency band to determine the time-amplitude data points for the center frequency of each band, produces a time-amplitude envelope, filters the time-amplitude envelope to generate a smooth time-amplitude envelope and approximates the smooth time-amplitude envelope to a minimum amount of time amplitude data points. In some embodiments, the audio analysis module 206 may implement a filterbanks or a spectrogram analysis. The output of the audio analysis module 206 is an analyzed audio descriptor data, which is provided to the authoring tool 208, and to the transformation module 210.

At step 1314, the authoring tool 208 receives the preprocessed audio signal from the audio preprocessor module 202, the analyzed audio descriptor data from the audio analysis module 206, and actuator specific information 222 and the device specific information 224 from the database module 220. The authoring tool 208 is utilized for editing analyzed audio descriptor data, tweaking the analyzed audio descriptor data, changing the analyzed audio descriptor data having time-amplitude data points to customize a haptic experience or introducing additional time-amplitude data points Additionally, the authoring tool 208 can be utilised for editing or reshaping the transient description data or to introduce additional time-time-transient data points to produce authored audio descriptor data and other authored data.

At step 1316, the transformation module 210 receives the analyzed audio descriptor data from the audio analysis module 206, the authored audio descriptor data and other authored data from the authoring tool 208. In addition, the transformation module 210 receives the actuator specific information 222 and the device specific information 224 by querying the database 220 with the device ID and actuator ID contained within the other authored data. The actuator specific information 222 and the device specific information 224 are utilized for determining the available bandwidth of the combined actuator 122 and the electronic computing device 102.

The transformation module 210 evaluates if the authored audio descriptor data from the authoring tool 208 can fit within the available bandwidth. If the authored audio descriptor data cannot fit in the available bandwidth then the transformation module 210 modifies the authored audio descriptor data such that it fits in the haptic perceptual bandwidth based upon the authored ranking of each frequency band. If the authored ranking is not provided then the transformation module 210 ranks the frequency bands based on mean energy content of each frequency and its distance of the highest acceleration frequency from the resonant frequency of the electronic computing device 102 with actuator 122. The authored audio descriptor data is then passed to the band equalization 1014 to increase or decrease the values of each band of the authored audio descriptor data to compensate for the non-linear frequency and acceleration response curve of the actuator. The output of the hand equalization 1014 is a transformed audio descriptor data, the other authored data and the authored audio descriptor data, which is then passed to the aggregation and file management module 212.

At step 1318, the aggregation and file management module 212 performs the aggregation of the transformed audio descriptor data, the transformed transient description data and the other authored data to create a computer readable file in one or more file formats. Finally, at step 1320, the computer readable file is parsed by the resynthesis module 214 to produce a haptic output.

The time-amplitude envelope of each frequency band and the time-transient score of the transformed transient descriptor data is then provided to one or more band synthesizers and the transient synthesizer to produce haptic output to drive one or more actuators 410-418 that create an immersive haptic experience. The process 1300 ends at step 1320.

Figure 14:
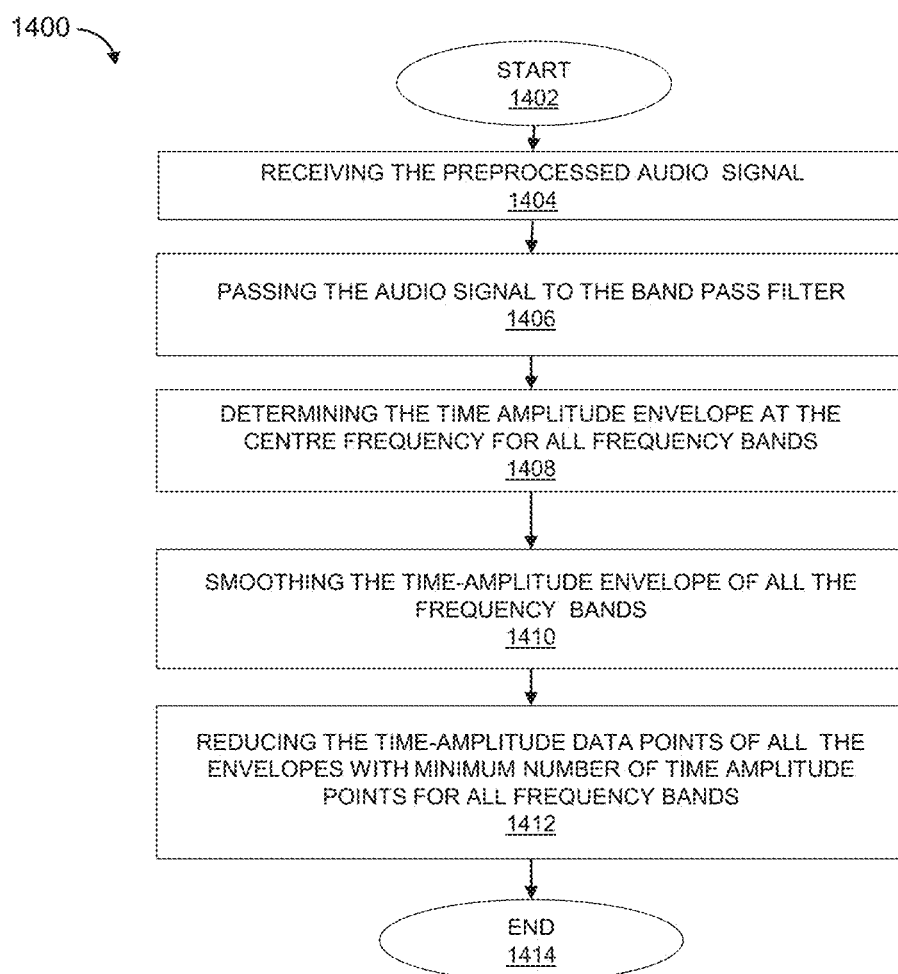
FIG. 14 illustrates a process flow diagram for converting the audio signal into analyzed audio descriptor data in the embodiment of the present invention.

Referring to FIG. 14, the process 1400 shows the processing of the audio signal in the filterbank in an embodiment of the invention. The process starts at 1402 and immediately moves to step 1404. At step 1404, the preprocessed audio signal is received.

At step 1406, the preprocessed signal is passed to one or more filter banks, where the preprocessed audio signal is separated into one or more frequency bands with each frequency band having a center frequency.

In other embodiments, the process 1400 for audio analysis may implement spectrogram analysis.

In some other embodiments, the process 1400 for audio analysis may implement harmonic-percussive-residual analysis.

At step 1408, the preprocessed audio signal is filtered by one or more filter banks. Each filter bank separates the audio signal into separate frequency bands. For each frequency band, the time-amplitude values are determined. Additionally, a center frequency is also determined for each frequency band. The time-amplitude values and the center frequency of each frequency band produces a time-amplitude envelope.

At step 1410, the time-amplitude envelope is passed to an envelope smoother to smooth out any large variations.

At step 1412, the smoothed time amplitude envelope is reproduced with minimum time-amplitude data points to reproduce the time-amplitude envelope with minimum loss of information.

Finally, the process 1400 produces an analyzed audio descriptor data from e audio signal. Finally, the process 1400 terminated at 1414.

Figure 15:
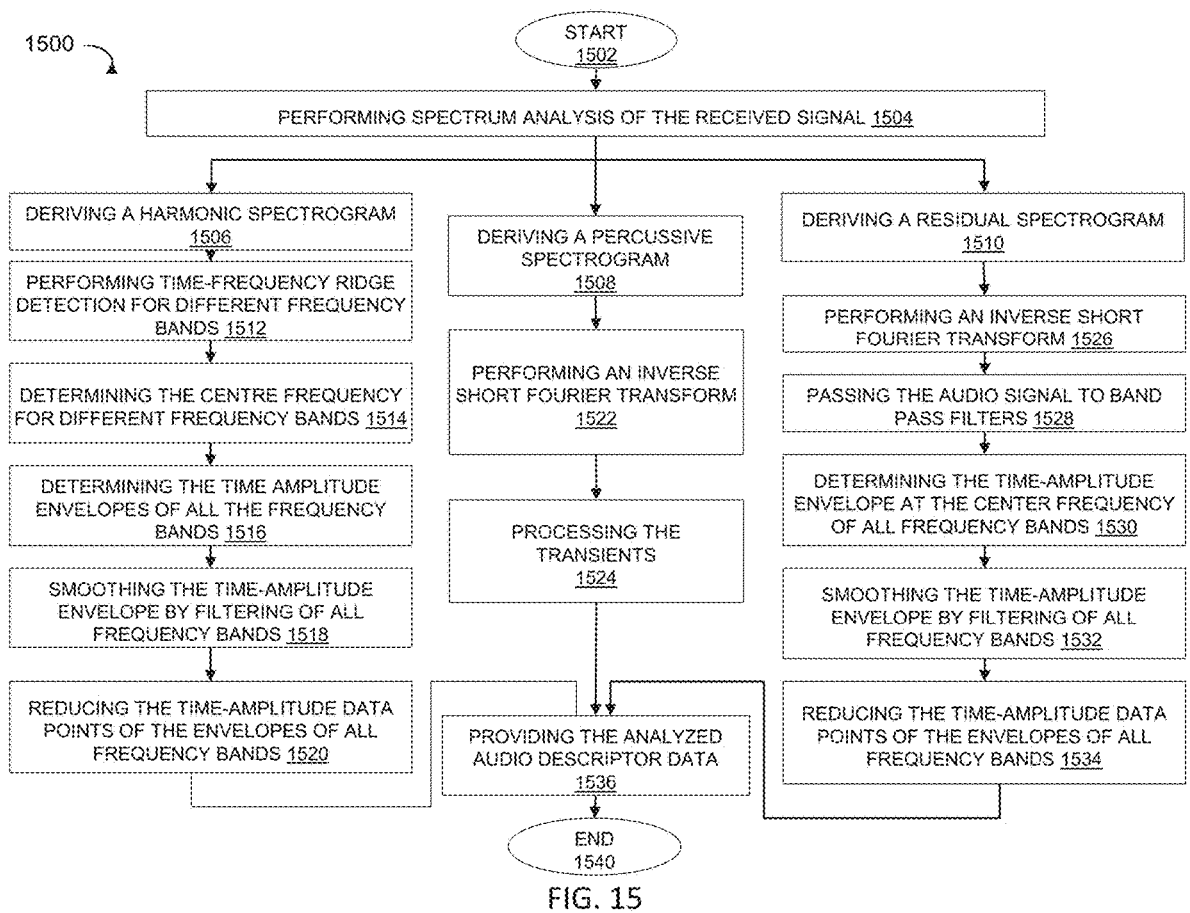
FIG. 15 illustrates the process flow diagram for converting the audio signal into the analyzed audio descriptor data in an alternate embodiment of the present invention.

Referring to FIG. 15, the process 1500 for converting the preprocessed audio signal into the analyzed audio descriptor data using spectrogram analysis in an embodiment of the invention. The process starts at 1502 and immediately moves on to 1504. At step 1504, the process 1500 performs a spectrogram analysis or spectral analysis of the preprocessed audio signal received from the preprocessor module 202. The spectrogram analysis produces a harmonic spectrogram at step 1506 and a percussive component at step 1508.

The harmonic spectrogram is analyzed at step 1512 using time-frequency ridge detection. The time-frequency ridge detection analyzes all the time-frequency values or the time-frequency amplitude values of each frequency band within the harmonic spectrogram to extracts at least one maximum-energy time-frequency ridge, which is an array of frequency and/or amplitude values over time. In other embodiments, time-frequency ridge detection analyzes all the time-frequency values or the time-frequency amplitude values of each frequency band within the harmonic spectrogram to extracts the maximum-energy time-frequency ridge, which is an array of frequency values or amplitude values.

At step 1514, the center frequency is determined by calculating the median frequency in each frequency band frequency. The median frequency is derived based on the array of frequencies determined at the step 1512. In another embodiment, the center value can be the middle value of each frequency band. At step 1516, the process 1500 produces a time-amplitude envelope from the time-amplitude values for each of the frequency bands by using an envelope follower.

In embodiments, the frequency bands can be defined by the user or partitioned based on a predefined partitioning formula.

At step 1518, the time-amplitude values are smoothened and filtered to reduce abrupt changes in the time-amplitude values of the time-amplitude envelope for each frequency band.

At step 1520, the time-amplitude envelope is reduced in size by representing the signal with a minimum number of time-amplitude values to minimise information loss. The audio descriptor data comprises frequency band descriptor data with the reduced time-amplitude envelopes, the center frequency and bandwidth for each of the frequency bands. The analyzed audio descriptor data is passed to the step 1536.

In one variation of this implementation, the TF-Ridge detection 710 can have a dedicated processor and a memory.

The percussive spectrogram derived at step 1508 is passed to inverse short fourier transform at step 1522 to convert the signal into a frequency domain from a time domain. At step 1524, the process 1500 analyzes the precursive component to detect and process the transients to produce the transient descriptor data. The transient descriptor data is then passed on to step 1536.

The audio descriptor data produced at step 1520, the transient descriptor data produced at step 1536 and the other descriptor data are combined to form the analyzed audio descriptor data. In embodiments, the audio descriptor data produced at step 1520, the transient descriptor data produced at step 1536 and the other descriptor data form separate streams but aggregated as one data stream to form the analyzed audio descriptor data.

In preferred embodiments, the process 1500 may perform audio analysis using the harmonic spectrogram and the percussive component and the audio descriptor data produced at step 1520, the transient descriptor data produced at step 1536 and the other descriptor data are combined to form the analyzed audio descriptor data at step 1540. The process 1500 terminates at step 1540.

In another variation of this implementation, the process 1500 may include the harmonic component, the percussive component and a residual component as shown in FIG. 15. The residual spectrogram is derived by subtracting the sum of harmonic component and the percussive component from the spectrogram of the preprocessed audio signal at step 1510. The residual component is converted into the time domain by performing a short inverse fourier transform of the residual spectrogram at step 1526. At step 1528, the process 1500 passes the time domain audio signal received from the step 1526 to the filter bank, for example filter bank 722. The filter bank 722 separates the audio signal into different frequency bands. Each frequency band has a center frequency, which is preferably the average of the upper cut-off frequency and the lower cut-off frequency of that frequency band. In some embodiments, the center frequency can be selected by the user through a graphical user interface.

At step 1532, the process 1500 determines the time-amplitude envelope of time-amplitude data points of the center frequency for each of the frequency bands with an envelope follower. At step 1532, the process 1500 filters the time-amplitude envelope to smooth out any abrupt changes in the time-amplitude envelope for each of the frequency bands. At step 1534, the process 1500 reduces the time-amplitude envelope to a minimum number of haptic values to reproduce time-amplitude envelope minimal information loss. Finally, the analyzed audio descriptor data comprising the frequency band descriptor data include reduced time-amplitude envelopes, the center frequency and bandwidth for each of the frequency bands. At step 1536, the audio descriptor data is produced, which comprises one or more frequency band descriptor data, the one or more frequency band descriptor data, the transient descriptor data and the other descriptor data. The output of the process 1500 is the analyzed audio descriptor data. The process 1500 terminates at step 1540.

Figure 16:
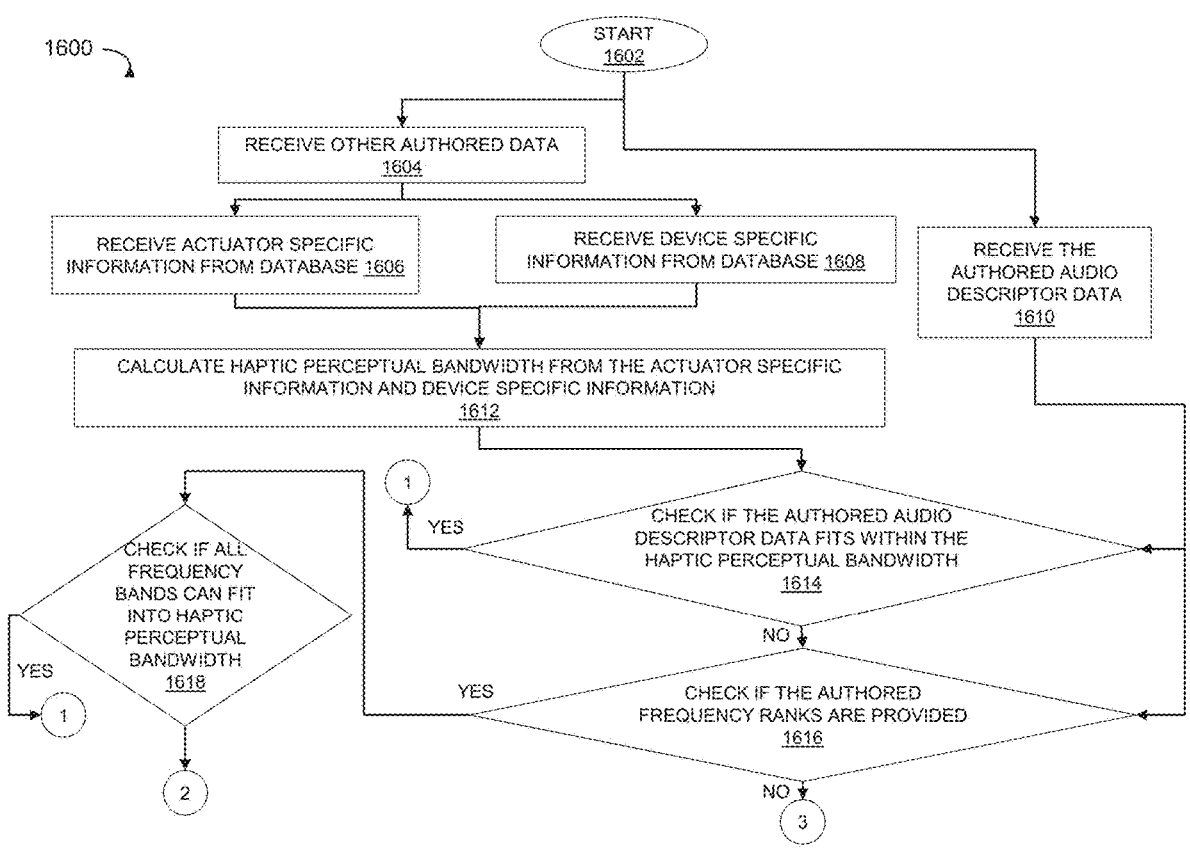
FIG. 16 illustrates the process of transforming an authored audio descriptor data to fit within a haptic perceptual bandwidth in an embodiment of the present invention.
Figure 16:
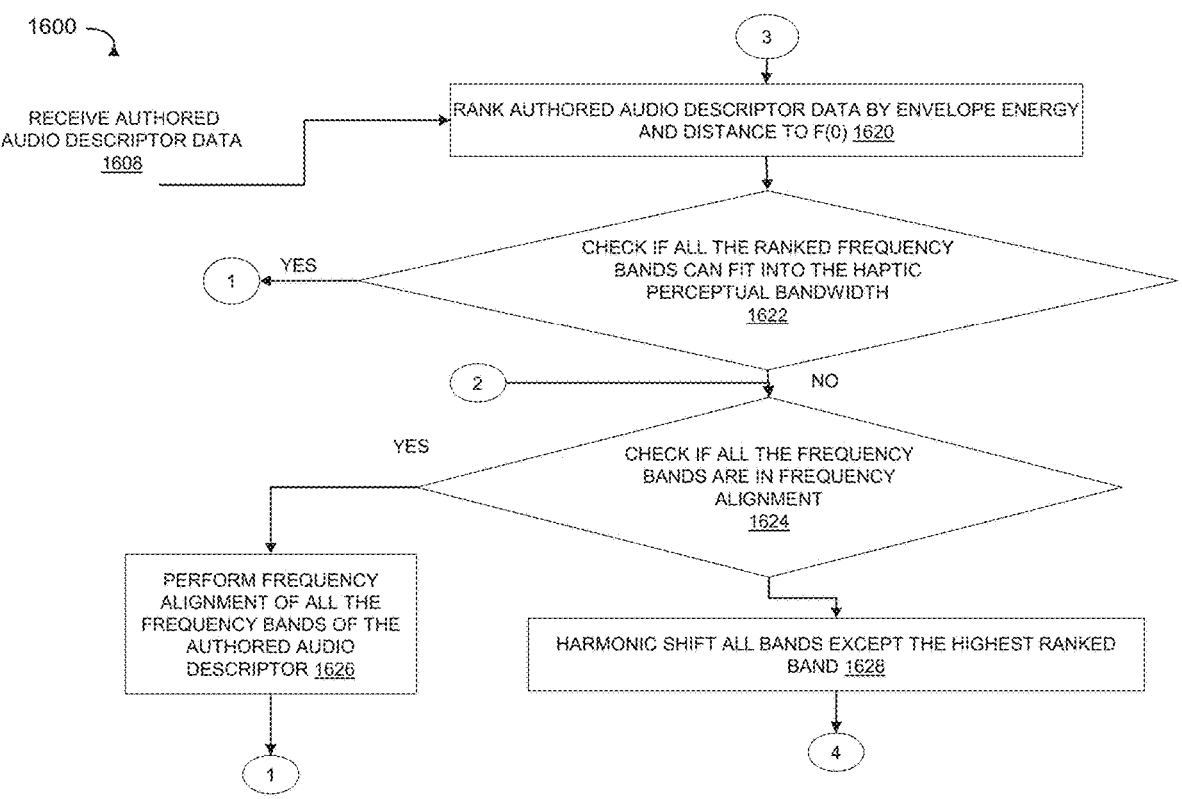
Figure 16:
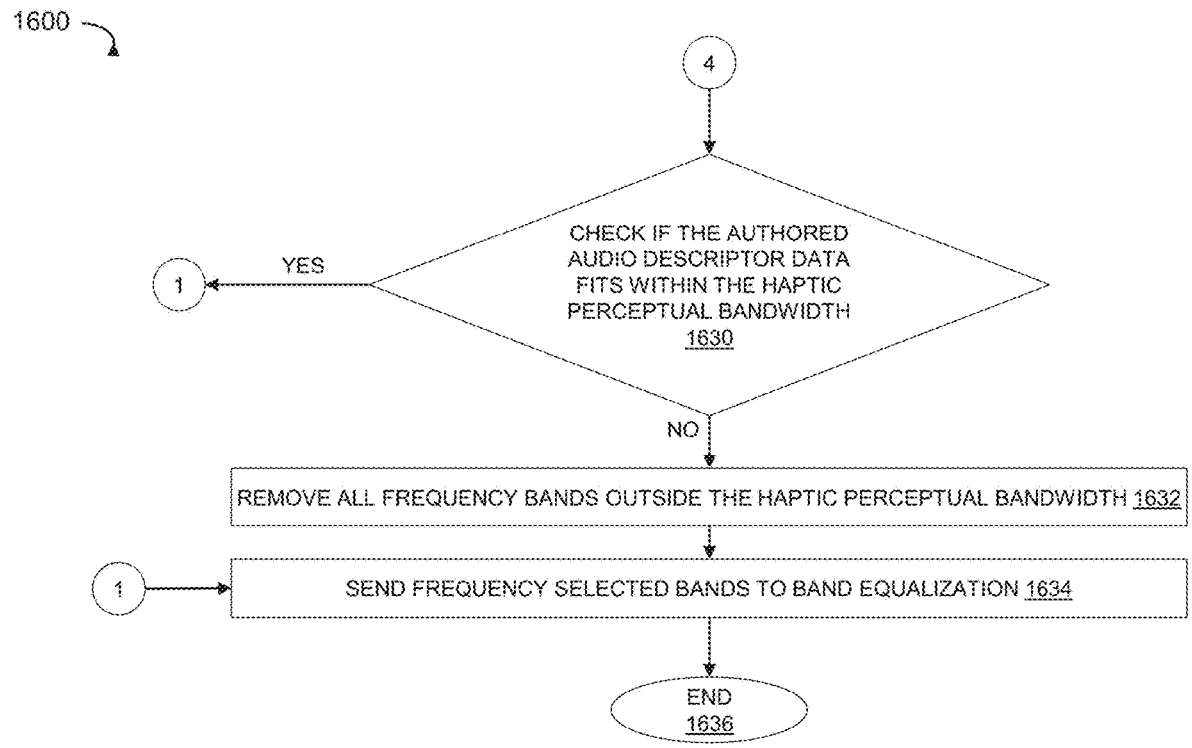

FIG. 16 illustrates the transformation process to fit the authored audio descriptor data into the haptic perceptual bandwidth in an embodiment of the invention. The main objective of the transformation process 1600 is to fit the authored audio descriptor data into the haptic perceptual bandwidth of the electronic computing device 102 having the actuator 122.

In some embodiments, the transformation process 1600 fits the authored audio descriptor data into the haptic perceptual bandwidth of more than one actuators, for example, the actuator 410-418 associated with the electronic computing device 102.

The transformation process 1600 starts at step 1602.

At step 1604, the transformation process 1600 receives the other authored data from the authoring tool 208. The other authored description data comprises the actuator specific information such as actuator ID and the device specific information such as the device ID. In addition, the transformation process 1600 receives the authored audio descriptor data at step 1610. At step 1606, the actuator specific information 222, which includes actuator II) is used to obtain actuator characteristics and specifications from the database 220. Similarly, at step 1608, the device specific information 224, which includes device ID is used to query device characteristics and specifications from the database 220.

At step 1612, the actuator characteristics and specifications and the device characteristics and specifications are utilised to calculate haptic perceptual bandwidth.

In some embodiments, the database is a distributed database and the actuator specific information 222 and the device specific information 224 required to calculate haptic perceptual bandwidth may directly be obtained from the information provided by the manufacturers technical specification datasheet. In other embodiments, the database 220 may be a distributed database. The distributed database may update the actuator specifications and the device specifications directly from the manufacturer by passing a query to the manufacturer database using a unique part number associated with the actuator and/or the device. In this implementation, the database is automatically updated with new releases of actuators and/or devices.

The transformation process 1600 receives authored audio descriptor data provided by the authoring tool 208 at step 1610. The authored audio descriptor data includes all the information related to the audio description data, the authored transient description data and other authored data.

At step 1614, the transformation process 1600 receives the authored audio descriptor data comprising the authored frequency band descriptor data for one or more bands, the authored transient descriptor data, and other authored data and checks if the center frequencies of each frequency band of the authored frequency band descriptor data can fit within the haptic perceptual bandwidth. If the authored audio descriptor data can fit in the haptic perceptual bandwidth then the transformation process 1600 moves to step 1634 and passes the authored audio descriptor data to the band equalization 1014. The band equalization 1014 passes the band normalised data to the aggregation and file management module 212 to create a haptic file.

Otherwise, the transformation process 1600 moves to step 1616.

At step 1616, the transformation process 1600 checks if the frequency band ranking for each frequency band is provided in the authored audio descriptor data. If the frequency band ranking is provided, then the transformation process 1600 moves to a step 1618. At step 1618, the transformation process 1600 tries to fit the frequency bands into the haptic perceptual bandwidth of the electronic computing device 102 with embedded actuator 122 according to the frequency band ranks. The transformation process 1600 moves to step 1634. For example, the transformation process 1600 first inserts the highest ranked frequency band in the haptic perceptual bandwidth of the electronic computing device with embedded actuator 122 followed by the second highest frequency band and so on.

If all the frequency bands cannot be inserted into the haptic perceptual bandwidth of the resonant frequency of the electronic computing device 102 having embedded actuator 122 then the transformation process 1600 moves to step 1616.

In an alternate embodiment, the transformation process 1600 instead of moving to step 1616 may discard the lower order frequency bands, which cannot be fitted into the haptic perceptual bandwidth of the electronic computing device 102 with embedded actuator 122. In another alternate embodiment, the transformation process 1600 may first align the center frequency of the highest ranked frequency band with the resonant frequency of the electronic computing device 102 having embedded actuator 122. Thereafter, the transformation process may fit the other frequency bands according to the ranking provided in the authoring tool 208. The frequency bands that can not fit into the haptic perceptual bandwidth are discarded.

In yet another alternate embodiment, the transformation process 1600 may first align the center frequency of the highest ranked frequency band with the resonant frequency of the electronic computing device 102 having embedded actuator 122. Subsequently, the transformation process 1600 determines the absolute difference between the center frequency, the center frequency of the highest ranked frequency band and the resonant frequency of the electronic computing device 102 having embedded actuator 122. The absolute difference is calculated by taking the modulus of $|(F-F0)|$, where F is the center frequency of the frequency band with the highest energy envelope and the F0 is the resonant frequency of the electronic computing device 102 with the embedded actuator 122. The transformation process 1600 then shift the center frequency of each frequency band by the modulus of $|(F-F0)|$ and then tries to fit each frequency band according to the frequency band ranks. The frequency bands that cannot be included into the haptic perceptual bandwidth are discarded.

Otherwise, the transformation process 1600 moves to step 1620.

At step 1620, the transformation process 1600 then tries to rank the authored audio descriptor data based on the mean square envelope energy content and the distance of the center frequency of each frequency band from the resonant frequency of the electronic computing device 102 with the embedded actuator 122. For example, the mean square envelope energy content can be calculated for each frequency band envelope based on time-amplitude values. The transformation process at step 1620 also receives the authored audio descriptor data from step 1608.

In embodiments, each frequency band may be ranked based on the mean envelope energy content, maximum envelope energy content, average envelope energy content or some other parameters.

Next the distance between the resonant frequency $f_0$ of the electronic computing device 102 having an embedded actuator 122 and $f_N$ (where N=1, 2, 3 . . . ) that represents the center frequency of the N th frequency band is determined by using the following formula $\Delta f_0 = \sqrt{(f_0 - f_N)^2}$. The determined distance for each frequency band is scaled to be on a weighting interval of $w_{\Delta f_0} \in [0.0, 1.0]$ by $$w_N = 1 - \frac{\Delta f_0}{\Delta_{max}}$$

with $\Delta_{max} = BW \cdot 0.5$ being the actuators half bandwidth (BW). Finally, the weighting is applied to each component by: $wMS_N = w_N \cdot MS_N$. This gives the ranking of each frequency band.

Once the mean square envelope enemy content and the center frequency of each frequency band has been computed then the transformation process 1600 tries to fit each of the frequency bands into the haptic perceptual bandwidth based on the calculated frequency ranks.

At step 1622, the transformation process 1600 evaluates if the ranked frequency bands can fit into the haptic perceptual bandwidth of the electronic computing device 102 having embedded actuator 122. If all the ranked frequency bands can fit into the haptic perceptual bandwidth of the electronic computing device 102 having embedded actuator 122 then the transformation process 1600 moves to step 1634 and passes the authored audio descriptor data to the band equalization 1014. The band equalization 1014 passes the band normalised data to the aggregation and file management module 212 to create a haptic file.

If all the frequency bands cannot fit into the haptic perceptual bandwidth of the electronic computing device 102 having embedded actuator 122 then the transformation process 1600 moves to step 1624.

At step 1624, the transformation process 1600 checks if all the frequency bands are in frequency alignment by evaluating if the center frequency of each frequency band is in a frequency alignment, that is, the center frequency of the lowest frequency hand is aligned to the resonant frequency of the electronic computing device 102 having embedded actuator 122. If yes, then the transformation process moves to step 1626 otherwise, it moves to step 1628.

At step 1626, the transformation process 1600 performs the frequency alignment. The frequency alignment starts by shifting the center frequency of the lowest frequency band to the resonant frequency of the electronic computing device 102 having embedded actuator 122. Likewise, the center frequency of other frequency bands by a shift scalar $$m_{shift} = \frac{f_0}{f_{C_1}}$$

where $f_0$ is me resonant frequency of the electronic computing device 102 having embedded actuator 122 and $f_{C_1}$ is the center frequency of the lowest frequency band. The shifted center frequency of each frequency bared is determined by formula Center frequency band·$m_{shift}$=Shifted frequency band. To illustrate with an example in an implementation using a logarithmically spaced filterbank arrangement from 30 to 120 Hz based on the Weber-Fechner law. Let the center frequencies of the following frequency bands be defined by an array [30.0, 39.58, 52.23, 68.92, 90.94, 120.0]. Let the resonant frequency of the electronic computing device 102 having embedded actuator 122 be $f_0$=60 and the center frequency of the lowest frequency band is $f_{C_1}$=30, then $$f_o = 60, f_{c_1} = 30, \frac{f_0}{f_c} = 2.$$

The center frequency of each frequency band will be shifted by $f_{N, shifted} = f_{N, original} \cdot 2$ In one variation of the frequency alignment, the shifting of frequency may be performed by shifting the center frequency of each frequency band by an octave. In one embodiment, the octave shift may be performed by moving the each frequency band to a higher octave frequency $f_{new} = 2 \cdot f_{original}$. Alternatively, the octave shifting may be performed by transposing each frequency band down to a new lower frequency $f_{new} = 0.5 \cdot f_{original}$.

Once, the frequency alignment has been completed, the transformation process 1600 moves to the step 1634.

When the frequency alignment can not be performed, the transformation process 1600 at step 1628 performs the harmonic shift of the center frequencies of each frequency band. The harmonic shifting and sifting is performed by scaling the center frequency of each frequency band by an integer R or any by an integer ratio 1/R. While performing harmonic shifting of center frequencies, the transformation process 1600 ensures that the center frequency of each frequency band is adjusted within the haptic perceptual bandwidth of the electronic computing device 102 having an embedded actuator 122.

In performing the harmonic shifting at step 1628, the center frequency of the highest ranked frequency band is aligned with the resonant frequency of the electronic computing device 102 having an embedded actuator 122. Subsequently, all other frequency bands are shifted by $$m_{shift} = \frac{f_0}{f_{C_1}}.$$

Where $f_{C_1}$ is the highest ranked frequency band and $f_0$ is the resonant frequency of the electronic computing device 102 having an embedded actuator 122.

For example if the resonant frequency of the electronic computing device 102 having embedded actuator 122 is $f_0$=126 and the highest ranked component $C_1$ with the center frequency $f_{C_1}$=42 then $m_{shift}$=126/42=3. In this case, the center frequency of the highest ranked frequency band is shifted by a factor 3. Likewise, the center frequency of all other frequency bands are multiplied by $m_{shift}$=126/42=3 to evaluate the shifted center frequency of each frequency band. Accordingly, all the frequency bands are shifted by the factor $m_{shift}$.

After performing the harmonic shift of each frequency band, the transformation process at step 1630 checks if the authored audio descriptor data fits within the haptic perceptual bandwidth of the electronic computing device 102 having an embedded actuator 122. If yes, the transformation process 1600 moves to step 1634. Otherwise, the transformation process 1600 moves to step 1632. At step 1632, if all the frequency bands cannot fit into the haptic perceptual bandwidth of the electronic computing device 102 having an embedded actuator 122 then the transformation process 1600 discards the frequency bands that fall outside the haptic perceptual bandwidth and thereafter moves to step 1634. More specifically, the transformation process 1600 removes all frequency bands of the authored frequency band descriptor data with center frequencies outside the haptic perceptual bandwidth and passes the remaining frequency bands with center frequencies within the haptic perceptual bandwidth of the haptic perceptual bandwidth of the electronic computing device 102 having an embedded actuator 122 to the band equalization module 1014 for further processing.

The band equalization 1014 passes the received transformed audio descriptor data comprising time-amplitude values of all the authored frequency bands to the aggregation and file management module 212. In addition, the transformation module 210 also provides the other authored data, which now includes the haptic perceptual bandwidth to the aggregation and file management module 212. Subsequently, the transformation process 1600 ends at 1632.

The transformation process 1600 terminates at step 1636.

The features, structures, or characteristics of the present invention described throughout this specification may be combined in any suitable manner in one or more embodiments. The different embodiments and implementations shown herein and the illustrated example and for the purposes of providing what is believed to be the most useful and readily understood description of the principles and conceptual aspects of the present invention in a non-limiting manner.

We claim:

1. An authoring system for authoring an audio signal into a haptic data file, the authoring system comprising:
    an audio analysis module configured to filter the audio signal into analyzed audio descriptor data comprising time-amplitude values and a center frequency for one or more frequency bands;
    a transient analysis and processing module configured to detect and analyze the transients in the audio signal, and to convert the analyzed transients into transient descriptor data comprising an array of time-transient score data points;
    an authoring tool comprising a user interface to display and modify the analyzed audio descriptor data comprising time-amplitude values and the transient descriptor data, wherein the analyzed audio descriptor data and the transient descriptor data values are editable to create an authored audio descriptor data;
    a database configured for providing one or more parameters having actuator specific information and device specific information associated with an electronic computing device having an embedded actuator to determine a haptic perceptual bandwidth of an electronic computing device having the embedded actuator to form other descriptor data;
    a transformation module for receiving the authored audio descriptor data and other descriptor data to fit the authored audio descriptor data into the haptic perceptual bandwidth to create a transformed audio descriptor data file; and an aggregation and file management module for converting the transformed audio descriptor data file into the haptic data file.

2. The authoring system of claim 1, wherein the audio analysis module implements one or more filterbanks.

3. The authoring system of claim 1, wherein the audio analysis module filters the audio signal using a harmonic percussive spectrogram.

4. The authoring system of claim 1, wherein the audio analysis module filters the audio signal using a harmonic percussive residual spectrogram.

5. The authoring system of claim 1, wherein the transformed audio descriptor data file is streamed in real time for producing haptic experience.

6. The authoring system of claim 1, wherein the haptic perceptual bandwidth is calculated by accessing the actuator specific information and device specific information stored in the database by determining the mass and the acceleration of the actuator embedded into the electronic computing device.

7. The authoring system of claim 1, wherein the device specific information includes a mass for the device, a UUID for the device, center of gravity of the device, geometric shape of the device, placement location of the embedded actuator, attachment characteristic of the embedded actuator, and inherent resonances of the device.

8. A computer implemented method of authoring an audio signal into a haptic data file, the method comprising:
    receiving the audio signal into an audio analysis module, wherein the audio analysis module filters the audio signal comprising time-amplitude values and a center frequency for one or more one frequency band;
    detecting the presence of transients in the audio signal and analyzing the transients;
    converting the analyzed transients into transient descriptor data;
    receiving one or more parameters to determine a perceptual haptic bandwidth of an electronic computing device having an embedded actuator;
    modifying the time-amplitude values for one or more frequency bands and the transient descriptor data through a user interface, wherein the time-amplitude values and the transient descriptor data are editable by a user to produce an authored audio descriptor data and other descriptor data;
    transforming the authored audio descriptor data and the other descriptor data to fit the authored audio descriptor data into the haptic perceptual bandwidth to create a transformed audio descriptor data file; and
    converting the transformed audio descriptor data file into the haptic data file.

9. The computer implemented method of claim 8, wherein the audio analysis module implements one or more filter banks.

10. The computer implemented method of claim 8, further comprising filtering, via the audio analysis module, the audio signal using a harmonic percussive spectrogram.

11. The computer implemented method of claim 8, further comprising filtering, via the audio analysis module, the audio signal using a harmonic percussive residual spectrogram.

12. The computer implemented method of claim 8, further comprising streaming the transformed audio descriptor data file in real time for producing haptic experience.

13. The computer implemented method of claim 8, further comprising determining the haptic perceptual bandwidth by using data received from the database by calculating mass and acceleration of the embedded actuator, wherein the embedded actuator is embedded into the electronic computing device.

14. The computer implemented method of claim 8, wherein the device specific information includes mass of the device, a UUID for the device, center of gravity of the device, geometric shape of the device, placement location of the embedded actuator, attachment characteristic of the embedded actuator, and inherent resonances of the device.

15. A non-transitory computer program product for authoring an audio signal into a haptic data file having encoded instructions embedded therein, when executed by a processor causes the processor to perform the steps of:
receiving the audio signal into an audio analysis module, wherein the audio analysis module filters the audio signal comprising time-amplitude values and a center frequency for one or more frequency bands;
detecting the presence of transients in the audio signal and analyzing the transients;
converting the analyzed transients into transient descriptor data;
receiving one or more parameters to determine a perceptual haptic bandwidth of an electronic computing device having an embedded actuator;
modifying the time-amplitude values for one or more frequency bands and the transient descriptor data through a user interface, wherein the time-amplitude values and the transient descriptor data are editable by a user to produce an authored audio descriptor data and other descriptor data;
transforming the authored audio descriptor data and the other descriptor data to fit the authored audio descriptor data into the haptic perceptual bandwidth to create a transformed audio descriptor data file; and
converting the transformed audio descriptor data file into the haptic data file.

16. The non-transitory computer program product of claim 15, wherein the encoded instructions, when executed by the processor, causes the processor to further perform the step of implementing one or more filterbanks via the audio analysis module.

17. The non-transitory computer program product of claim 15, wherein the encoded instructions; when executed by the processor, causes the processor to further perform the step of filtering, via the audio analysis module, the audio signal using a harmonic percussive spectrogram.

18. The non-transitory computer program product of claim 15, wherein the encoded instructions, when executed by the processor, causes the processor to further perform the step of filtering, via the audio analysis module, the audio signal using a harmonic percussive residual spectrogram.

19. The non-transitory computer program product of claim 15, wherein the encoded instructions, when executed by the processor; causes the processor to further perform the step of streaming the transformed audio descriptor data file in real time for producing haptic experience.

20. The non-transitory computer program product of claim 15, wherein the haptic perceptual bandwidth is determined by using data received from the database by calculating mass and acceleration of the embedded actuator, wherein the embedded actuator is embedded into the electronic computing device.

* * * * *